United States Patent
Takizawa

(10) Patent No.: US 12,445,179 B2
(45) Date of Patent: Oct. 14, 2025

(54) RELAY STATION, INFORMATION PROCESSING APPARATUS, AND METHOD

(71) Applicant: TOYOTA JIDOSHA KABUSHIKI KAISHA, Toyota (JP)

(72) Inventor: Kenichi Takizawa, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/443,048

(22) Filed: Feb. 15, 2024

(65) Prior Publication Data
US 2024/0283505 A1   Aug. 22, 2024

(30) Foreign Application Priority Data
Feb. 16, 2023   (JP) ................. 2023-022482

(51) Int. Cl.
*H04B 7/06* (2006.01)
*H04W 88/04* (2009.01)

(52) U.S. Cl.
CPC .......... *H04B 7/0617* (2013.01); *H04W 88/04* (2013.01)

(58) Field of Classification Search
CPC ............ H04B 7/0617; H04B 7/06954; H04B 7/1555; H04B 7/0632; H04B 7/063; H04W 88/04; H04W 72/046; H04W 72/0446; H04W 72/0453
See application file for complete search history.

(56) References Cited

U.S. PATENT DOCUMENTS

| | | | |
|---|---|---|---|
| 11,012,144 B2 * | 5/2021 | Khandani | ............ H04B 7/1555 |
| 2021/0051679 A1 | 2/2021 | Abedini et al. | |
| 2021/0126694 A1 | 4/2021 | Abedini et al. | |

OTHER PUBLICATIONS

3rd Generation Partnership Project, "3GPP TS 38.174 V17.0.0", dated Mar. 2022, pp. 1-317.
3rd Generation Partnership Project, "3GPP TS 38.106 V1.0.0", dated Mar. 2022, pp. 1-75.

* cited by examiner

*Primary Examiner* — Vineeta S Panwalkar
(74) *Attorney, Agent, or Firm* — Finnegan, Henderson, Farabow, Garrett and Dunner, LLP

(57) ABSTRACT

A relay station includes first antennas used for communication with the terminal station, a second antenna used for communication with a base station, and a radio device performing non-regenerative relay. The relay station transmits a first beam pattern with an maximum SINR of a received signal from the terminal station, the received signal including a part of self-interference and measured in a first slot of a wireless frame. An information processing apparatus acquires a beam pattern set based on the first beam pattern and transmits to the relay station. In a second slot, based on SINRs of received signals from the terminal station measured for each of beam patterns included in the beam pattern set in a plurality of symbols, the relay station selects a second beam pattern from the beam pattern set, and updates a beam pattern to be used by the first antennas to the second beam pattern.

20 Claims, 17 Drawing Sheets

US 12,445,179 B2

RELAY STATION, INFORMATION PROCESSING APPARATUS, AND METHOD

CROSS REFERENCE TO RELATED APPLICATION

This application claims the benefit of Japanese Patent Application No. 2023-022482, filed on Feb. 16, 2023, which is hereby incorporated by reference herein in its entirety.

BACKGROUND

Technical Field

The present disclosure relates to a relay station, an information processing apparatus, and a method.

Description of the Related Art

In wireless communication such as the 5th generation mobile communication system (5G), ultra-low latency communication with a sub-millisecond or shorter latency is expected. Meanwhile, from the perspective of communication service improvement, expansion of a coverage area of a cell is desired. For the expansion, relay communication via a relay station is effective. Therefore, there is proposed a wireless communication method in which a terminal station that performs wireless communication serves as a relay station. Furthermore, as a low-latency relay technique, non-regenerative relay is preferable in which, at a relay station, signal amplification and simple filtering are performed without demodulation or decoding.

CITATION LIST

Non-Patent Document

[Non-Patent Document 1] 3GPP TS 38.174 V17.0.0 (2022-03)

[Non-Patent Document 2] 3GPP TS 38.106 V1.0.0 (2022-03)

By using beam forming in which a plurality of antenna elements are used to enhance antenna gain for a terminal station, communication quality can be improved. A direction in which radio waves converge through beam forming by the plurality of antennal elements is set by a beam pattern. That is, in beam forming, by switching the beam pattern, it is possible to enhance the antenna gain for the terminal station in response to movement of the terminal station.

When a terminal station moves at a high speed, an optimal beam pattern of an antenna for the terminal station at a relay station changes for each slot or symbol. Therefore, if the relay station does not update a beam pattern in response to the high-speed movement of the terminal station, an SINR (signal to interference and noise power ratio) of a relayed signal decreases, and there is a possibility that non-regenerative relay can no longer be continued. As the high-speed movement of a terminal station, for example, movement at 200 km/h to 300 km/h on the Shinkansen is assumed. The high-speed movement, however, is not limited thereto, and the movement speed regarded as high-speed movement of a terminal station changes according to a frequency band used in wireless communication.

One of aspects of the present disclosure is to provide a relay station, an information processing apparatus, and a method capable of providing stable communication by non-regenerative relay even when a terminal station moves at a high speed.

SUMMARY

An aspect of the present disclosure is a relay station including:
a plurality of first antennas used for communication with a terminal station which is movable, wherein a beam direction of the plurality of first antennas are controlled according to a predetermined beam pattern and the beam direction is a direction in which antenna gain is increased;
one or more second antennas used for communication with a base station;
a radio device configured to perform non-regenerative relay of relaying a signal without demodulating or decoding the signal between the base station and the terminal station; and
a controller configured to:
acquire information about a beam pattern set acquired based on a first beam pattern that causes an SINR (signal to interference and noise power ratio) of a received signal from the terminal station to be largest, the received signal having been measured in a first slot of a wireless frame and including at least a part of self-interference that occurs between signals transmitted and received by the plurality of first antennas and signals transmitted and received by the one or more second antennas by the non-regenerative relay;
select, in a second slot after the first slot, a second beam pattern from among a plurality of beam patterns included in the beam pattern set, based on SINRs of received signals from the terminal station, wherein each of the received signals includes at least the part of the self-interference, and wherein the received signals are measured in one or more consecutive symbols for each of the plurality of beam patterns; and
update a beam pattern to be used for the plurality of first antennas to the second beam pattern, in a symbol following the one or more consecutive symbols.

Another aspect of the present disclosure is an information processing apparatus including a controller configured to:
receive a first beam pattern from a relay station, wherein the relay station includes a plurality of first antennas used for communication with a terminal station which is movable, one or more second antennas used for communication with a base station, and a radio device configured to perform non-regenerative relay of relaying a signal without demodulating or decoding the signal between the base station and the terminal station, wherein a beam direction of the plurality of first antennas are controlled according to a predetermined beam pattern and the beam direction is a direction in which antenna gain is increased, wherein the first beam pattern causes an SINR (signal to interference and noise power ratio) of a received signal from the terminal station to be largest, and wherein the received signal has been measured in a first slot of a wireless frame and including at least a part of self-interference that occurs between signals transmitted and received by the plurality of first antennas transmitted and received by the one or more second antennas by the non-regenerative relay and signals;
acquire information about a beam pattern set based on the first beam pattern; and transmit the information about the beam pattern set to the relay station; wherein
the relay station:
selects, in a second slot after the first slot, a second beam pattern from among a plurality of beam patterns included in the beam pattern set, based on SINRs of received signals from the terminal station, wherein each of the received signals includes at least the part of the self-interference, and wherein the received signals are measured in one or more consecutive symbols for each of the plurality of beam patterns; and
update a beam pattern to be used for the plurality of first antennas to the second beam pattern, in a symbol following the one or more consecutive symbols.

Another aspect of the present disclosure is a method including:
transmitting, by a relay station, a first beam pattern that causes an SINR (signal to interference and noise power ratio) of a received signal from a terminal station which is movable to be largest, the received signal having been measured in a first slot of a wireless frame and including at least a part of self-interference that occurs between signals transmitted and received by a plurality of first antennas and signals transmitted and received by one or more second antennas by non-regenerative relay, the relay station comprising:
the plurality of first antennas used for communication with the terminal station, wherein a beam direction of the plurality of first antennas are controlled according to a predetermined beam pattern and the beam direction is a direction in which antenna gain is increased;
the one or more second antennas used for communication with a base station; and
a radio device configured to perform the non-regenerative relay of relaying a signal without demodulating or decoding the signal between the base station and the terminal station; and
receiving, by an information processing apparatus, the first beam pattern from the relay station;
acquiring, the information processing apparatus, information about a beam pattern set based on the first beam pattern;
transmitting, by the information processing apparatus, the information about the beam pattern set to the relay station;
selecting, the relay station, in a second slot after the first slot, a second beam pattern from among a plurality of beam patterns included in the beam pattern set, based on SINRs of received signals from the terminal station, wherein each of the received signals includes at least the part of the self-interference, wherein the received signals are measured in one or more consecutive symbols for each of the plurality of beam patterns; and
updating, the relay station, a beam pattern to be used for the plurality of first antennas to the second beam pattern, in a symbol following the one or more consecutive symbols.

According to one of aspects of the present disclosure, it is possible to provide stable communication by non-regenerative relay even when a terminal station moves at a high speed.

DESCRIPTION OF THE EMBODIMENTS

Figure 1:
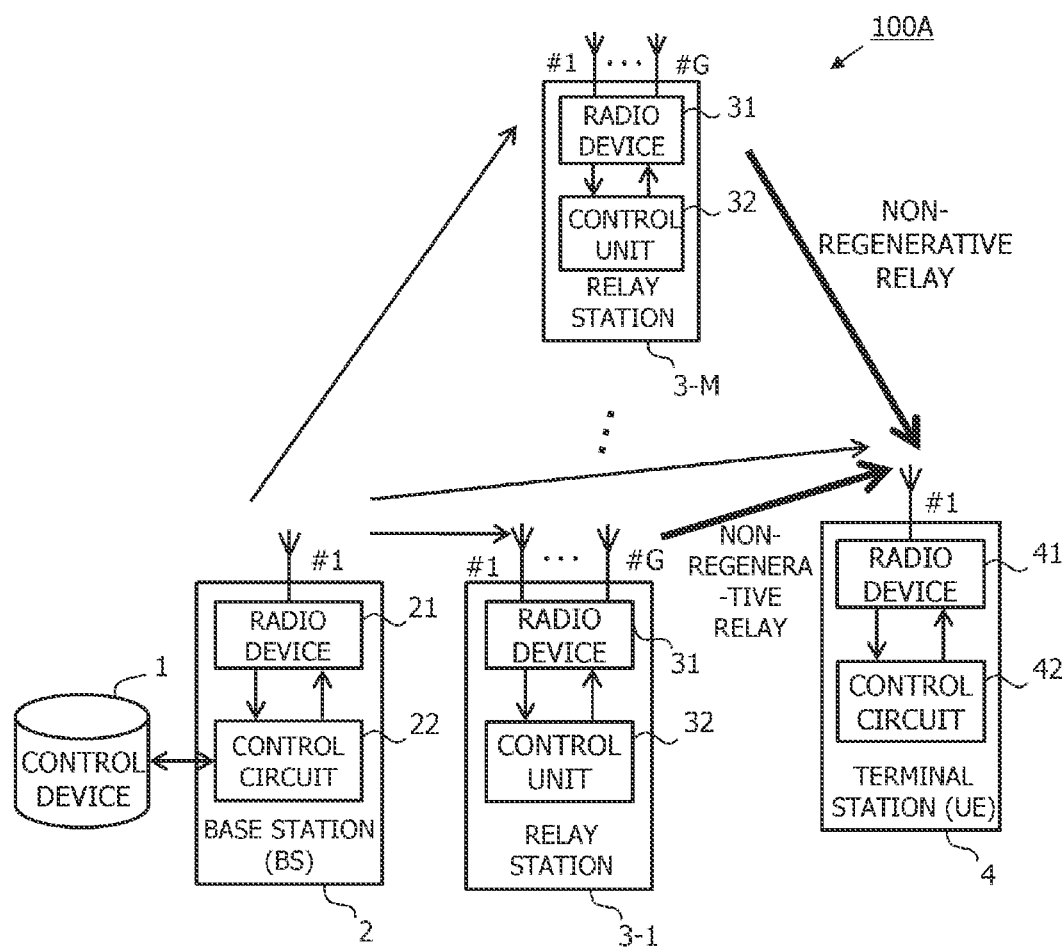
FIG. 1 is a diagram illustrating an example of a system configuration of a communication system according to a first embodiment.

In one of aspects of the present disclosure, a plurality of beam patterns may be assigned to a relay station, the plurality of beam patterns being assumed to cause an SINR of a received signal from a terminal station to be largest. The relay station may update a beam pattern to be used, with a beam pattern among the plurality of beam patterns, for every one or more symbols. Thereby, even when a terminal moves at a high speed, stable communication by non-regenerative relay can be provided.

More specifically, one of the aspects of the present disclosure may be a relay station. The relay station may include a plurality of first antennas used for communication with a terminal station which is movable, one or more second antennas used for communication with a base station, a radio device configured to perform non-regenerative relay of relaying a signal without demodulating or decoding the signal between the base station and the terminal station, and a controller. For the plurality of first antenna, a beam direction in which antenna gain is increased may be controlled according to a predetermined beam pattern.

The relay station may be, for example, a base station, a small base station, a mobile base station, a smartphone, or an onboard apparatus. The controller may be, for example, a processor such as a CPU (central processing unit), DSP (digital signal processor) or a GPU (graphics processing unit), or an arithmetic circuit such as an FPGA (field programmable gate array).

The plurality of first antennas and the one or more second antennas provided in the relay station may be, for example, adaptive array antennas. Each adaptive array antenna may be an array antenna in which a plurality of antenna elements are arrayed. The adaptive array antenna may be capable of electrically changing directivity by performing adaptive control of weighting of each antenna element according to propagation environment. A beam pattern may indicate angular dependence of reception sensitivity on a main axis of the antenna. In beam forming, the main axis of an antenna may refer to a direction in which the antenna gain of the plurality of antenna elements is increased. That is, a beam pattern may change depending on the direction in which the antenna gain is increased. Hereinafter, a direction in which antenna gain from the plurality of first antennas will be referred to as a beam direction.

The controller may be configured to acquire information about a beam pattern set acquired based on a first beam pattern that causes an SINR of a received signal from the terminal station to be largest, the received signal having been measured in a first slot of a wireless frame and including at least a part of self-interference. Power due to self-interference may occur between signals transmitted and received by the plurality of first antennas and signals transmitted and received by the one or more second antennas by non-regenerative relay. The controller may be configured to select, in a second slot, a second beam pattern from among a plurality of beam patterns included in the beam pattern set, based on SINRs of received signals from the terminal station, wherein each of the received signals includes at least the part of the self-interference, and wherein the received signals are measured in one or more consecutive symbols for each of the plurality of beam patterns included. Further, the controller may be configured to update a beam pattern to be used for the plurality of first antennas to the second beam pattern, in a symbol following the one or plurality of consecutive symbols.

A wireless frame has a time length of 10 milliseconds. Ten slots are included in one wireless frame. A slot is a basic transmission unit for demodulation and decoding. Any of an uplink and a downlink is assigned to each slot. In a period of a slot to which the uplink is assigned, communication in an uplink direction is performed. In a period of a slot to which the downlink is assigned, communication in a downlink direction is performed. The first and second slots may be, for example, uplink slots. A predetermined number of symbols are included in one slot. A symbol is a period during which a state of one set of phase and amplitude continues in a modulation signal. That is, a beam pattern used for an antenna can be updated at a timing of switching a slot. As for the number of symbols included in one slot, for example, the number differs depending on an interval between sub-carriers in OFDM (orthogonal frequency-division multiple access), which is a modulation method adopted in the 5G. For example, when the interval between sub-carriers is 15 kHz in the OFDM which is the modulation method, fourteen symbols are included in one slot.

In one of the aspects of the present disclosure, the relay station may determine a beam pattern to be used in the next slot from the beam pattern set, based on the SINR in each beam pattern in one or more symbols. Further, the SINR may be calculated in consideration of at least a part of self-interference at the relay station due to non-regenerative relay being included in a received signal from the terminal station. Furthermore, the beam pattern set may be acquired based on a beam pattern that causes the SINR to be largest in the first slot. Thereby, even when the terminal station moves at a high speed, a beam pattern can be switched to such a beam pattern that the SINR does not become too low to continue communication in response to movement of the terminal station, and stable communication by non-regenerative relay can be provided.

In one of the aspects of the present disclosure, the information about the beam pattern set may include information about a third beam pattern acquired based on the first beam pattern and information about the plurality of beam patterns, wherein beam directions at the plurality of beam patterns are beam directions within a first beam-direction range defined by a first angle from a beam direction at the third beam pattern. That is, the beam pattern set assigned to the relay station may include not a plurality of beam patterns with different beam directions but a plurality of beam patterns with beam directions within the first range. The third beam pattern is obtained based on the first beam pattern that causes the SINR to be largest in the first slot, and the first beam-direction range may be defined based on the third beam pattern. Therefore, the beam pattern set assigned to the relay station may include a plurality of beam patterns that are likely to cause the SINR to be largest in a certain slot or symbol after the first slot. By a beam pattern to be used by the plurality of first antennas being selected from the beam pattern set, a beam pattern can be switched to such a beam pattern that the SINR does not become too low to continue communication. The first angle may be an angle of an azimuth direction or elevation angle of the first antennas, may be an angle in a three-dimensional coordinate space formed by the azimuth direction or elevation angle of the first antennas, or may be an angle indicated by the angles of the azimuth direction and elevation angle of the first antennas.

In one of the aspects of the present disclosure, the plurality of beam patterns included in the beam pattern set may be arranged such that beam directions at the plurality of beam patterns are at equal angular intervals of a second angle. Further, the information about the plurality of beam patterns may include at least the first angle and the second angle. Similarly to the first angle, the second angle may also be an angle of the azimuth direction or elevation angle of the first antennas, may be an angle in the three-dimensional coordinate space formed by the azimuth direction or elevation angle of the first antennas, or may be an angle indicated by the angles of the azimuth direction and elevation angle of the first antennas. By the beam pattern set assigned to the relay station being a plurality of beam patterns arranged such that the beam directions are at equal angular intervals of the second angle, the beam directions of the beam patterns can be distributed within the first range. Thereby, it is possible to search for a more optimal beam pattern thoroughly within the first range.

In one of the aspects of the present disclosure, the first range may have a width of the first angle in each of a positive direction and a negative direction from the beam direction at the third beam pattern. In this case, the third beam pattern may be set to the first beam pattern. Further, the first angle may be set to a first predetermined value set in advance and the second angle may be set to a second predetermined value set in advance. If each of the third beam pattern, the first angle, and the second angle is acquired according to a setting defined in advance, complicated processing is not performed, and, therefore, it is possible to reduce a processing load on an apparatus that generates the information about the beam pattern set. The apparatus that generates the information about the beam pattern set may be, for example, the relay station, a control apparatus, or the base station.

In one of the aspects of the present disclosure, the controller may be configured to acquire the first beam pattern that causes the SINR of the received signal from the terminal station, to be largest at a predetermined timing, the received signal including at least the part of the self-interference. The predetermined timing may be, for example, a predetermined symbol in an uplink slot. In this case, the third beam pattern may be set to the first beam pattern acquired in the first slot. The first angle may be set to a first change amount of a beam-direction angle from the first beam pattern in the first slot to a beam pattern that causes the SINR to be largest in a fourth slot, the first change amount being estimated from a first beam direction change caused by change from the first beam pattern in a third slot to the first beam pattern in the first slot, the third slot being a slot in which the first beam pattern is acquired immediately before the first slot, and the forth slot being a slot in which the first beam pattern is scheduled to be acquired immediately after the first slot. The second angle may be set to a second change amount of a beam-direction angle per symbol in a period between acquisition timings of the first beam pattern in the first slot and the beam pattern that causes the SINR to be largest in the fourth slot, the second change amount being estimated from the first change.

That is, the first and second angles are acquired based on change in an optimal beam pattern for usage with the plurality of first antennas, the optimal beam pattern changing according to movement of the terminal station. For example, as the movement speed of the terminal station becomes faster, the first angle increases, and the first range also increases. Further, since the first angle (the first change amount) can take a positive or negative value according to the movement direction of the terminal station, the first range is set to face a movement direction of the terminal station in the fourth slot. Therefore, by the third beam pattern, the first angle, and the second angle being set in consideration of movement of the terminal station, it is possible to acquire the first range grasping the position of the terminal station in the fourth slot more accurately. Thereby, it is possible to cause the beam direction at the beam pattern for the plurality of first antennas to face the position of the terminal station more accurately.

In one of the aspects of the present disclosure, the controller may be configured to receive the information about the beam pattern set from a first apparatus on an upstream side. That is, the information about the beam pattern set may be generated by the first apparatus. The first apparatus may be, for example, the control apparatus or the base station. Thereby, in a whole wireless network system, the first apparatus can centrally control beam patterns used for each relay station. The information about the beam pattern set may be generated by the relay station itself. In this case, in acquisition of the information about the beam pattern set, latency due to communication does not occur, and it is possible to perform update to an optimal beam pattern in response movement of the terminal station earlier.

In the present disclosure, the optimal beam pattern refers to a beam pattern in which a larger SINR can be obtained.

In the case where the information about the beam pattern set is received from the first apparatus, the third beam pattern may be set to a beam pattern obtained by changing a beam direction at the first beam pattern acquired in the first slot by an amount corresponding to a third change amount of a beam-direction angle caused by change from the first beam pattern in the first slot to a beam pattern estimated to cause the SINR to be largest in the second slot, the third change amount corresponding to a time difference between the first slot and the second slot in which use of the information about the beam pattern set is started at the relay station, the third change amount being estimated from the first change. That is, the third change amount of the angle is an angle offset in consideration of a time interval until when use of the information about the beam pattern set is started at the relay station. Thereby, in the second slot where the information about the beam pattern set is used, a beam pattern set grasping the position of the terminal station more accurately can be assigned to the relay station. The relay station can update the beam pattern to be used by the plurality of first antennas to a beam pattern that causes the largest value of the SINR to be much larger, that is, a beam pattern with a beam direction facing the position of the terminal station more accurately.

Another aspect of the present disclosure can also be identified as an information processing apparatus that acquires the information about the beam pattern set and transmits the information to the relay station. Further, another aspect of the present disclosure can also be identified as a method including a process, executed by the information processing apparatus, acquiring the information about the beam pattern set and a process, executed by the relay station, selecting a beam pattern to be used from the beam pattern set and updating the beam pattern. Specifically, the method is a method including: transmitting, by a relay station, a first beam pattern that causes an SINR (signal to interference and noise power ratio) of a received signal from a terminal station which is movable to be largest, the received signal having been measured in a first slot of a wireless frame and including at least a part of self-interference that occurs between signals transmitted and received by a plurality of first antennas and signals transmitted and received by one or more second antennas by the non-regenerative relay, the relay station including: the plurality of first antennas used for communication with the terminal station, wherein a beam direction of the plurality of first antennas are controlled according to a predetermined beam pattern and the beam direction is a direction in which antenna gain is increased; the one or more second antennas used for communication with a base station; and a radio device configured to perform non-regenerative relay of relaying a signal without demodulating or decoding the signal between the base station and the terminal station; receiving, by an information processing apparatus, the first beam pattern from the relay station; acquiring, by the information processing apparatus, information about a beam pattern set based on the first beam pattern; transmitting, by the information processing apparatus, the information about the beam pattern set to the relay station; selecting, by the relay station, in a second slot after the first slot, a second beam pattern from among a plurality of beam patterns included in the beam pattern set, based on SINRs of received signals from the terminal station, wherein each of the received signals includes at least the part of the self-interference, wherein the received signals are measured in one or more consecutive symbols for each of the plurality of beam patterns; and updating, by the relay station, a beam pattern to be used for the plurality of first antennas to the second beam pattern, in a symbol following the one or more consecutive symbols.

Another aspect can also be identified as a program for causing the relay station or the information processing apparatus to execute the method, and a computer-readable non-transitory storage medium in which the program is recorded.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of a system configuration of a communication system 100A according to a first embodiment. The communication system 100A includes a control apparatus 1, a base station 2, relay stations 3 (3-1, . . . , 3-M), and a terminal station 4. The control apparatus 1 is an apparatus on a core network to which the base station 2 is connected. It is, however, also conceivable that the control apparatus 1 is the core network itself or a system included in the core network. The core network includes, for example, a fiber-optic network. The control apparatus 1 controls the base station 2, the relay stations 3, and the terminal station 4 and provides communication services to the terminal station 4.

The base station 2 provides a wireless access network to the terminal station 4. An area where wireless communication by the wireless access network is possible is also referred to as a cell. In the first embodiment, the base station 2 has one or more antennas (for example, #1), a radio device 21 connected to the one or more antennas and a control circuit 22. The control circuit 22 includes, for example, a processor and a memory. The processor controls communication with the control apparatus 1 and wireless communication with the relay stations 3 and the terminal station 4, by a computer program on the memory.

The terminal station 4 is a mobile station, for example, a smartphone, a tablet terminal, a wearable terminal, or a data communication apparatus mounted on a vehicle. The terminal station 4, however, is not limited thereto and may be a stationary-type terminal apparatus. For example, the terminal apparatus connects to the wireless access network within the cell provided by the base station 2. Each relay station 3 relays wireless communication between the base station 2 and the terminal station 4. Each relay station 3 is, for example, a small base station, a mobile base station, an onboard apparatus, a smartphone, or the like. In the first embodiment, each relay station 3 is an apparatus selected as a relay station by the control apparatus 1 from among apparatuses provided with a configuration capable of non-regenerative relay.

When a connection request from the terminal station 4 occurs, the control apparatus 1 selects one or more apparatuses located within the cell provided by the base station 2 as the relay stations 3, and instructs the relay stations 3 to relay wireless communication. In the first embodiment, when the plurality of relay stations 3 are individually distinguished, branch numbers are attached like the relay stations 3-1, . . . , 3-M. Here, the branch number M is an integer indicating the number of relay stations 3. In FIG. 1, the relay stations 3-1 and 3-M are illustrated. When the relay stations 3-1, . . . , 3-M are generically mentioned, however, they will be referred to simply as the relay stations 3.

Each relay station 3 has a plurality of antennas (for example, #1, . . . , #G), a radio device 31 connected to the plurality of antennas, and a control unit 32. Though the relay station 3 is illustrated as being provided with one radio device 31 in FIG. 1, the relay station 3 is not limited thereto and may be provided with a plurality of radio devices 31, one for each antenna.

The terminal station 4 has one or more antennas (for example, #1), a radio device 41 connected to the one or more antennas, and a control circuit 42. For example, by a mobile station in the cell requesting the base station 2 to connect the mobile station to the wireless access network and then being connected, the mobile station operates as the terminal station 4. The mobile station in the cell may directly request the base station 2 to connect the mobile station to the wireless access network. Alternatively, a mobile station in the cell may request the base station 2 to connect the mobile station to the wireless access network via an apparatus operating as a relay station 3 in the cell. The terminal station 4 can be said to be a station capable of communicating with the base station 2 via any of the one or more relay stations 3 or not via any of the one or more relay stations 3.

Figure 2:
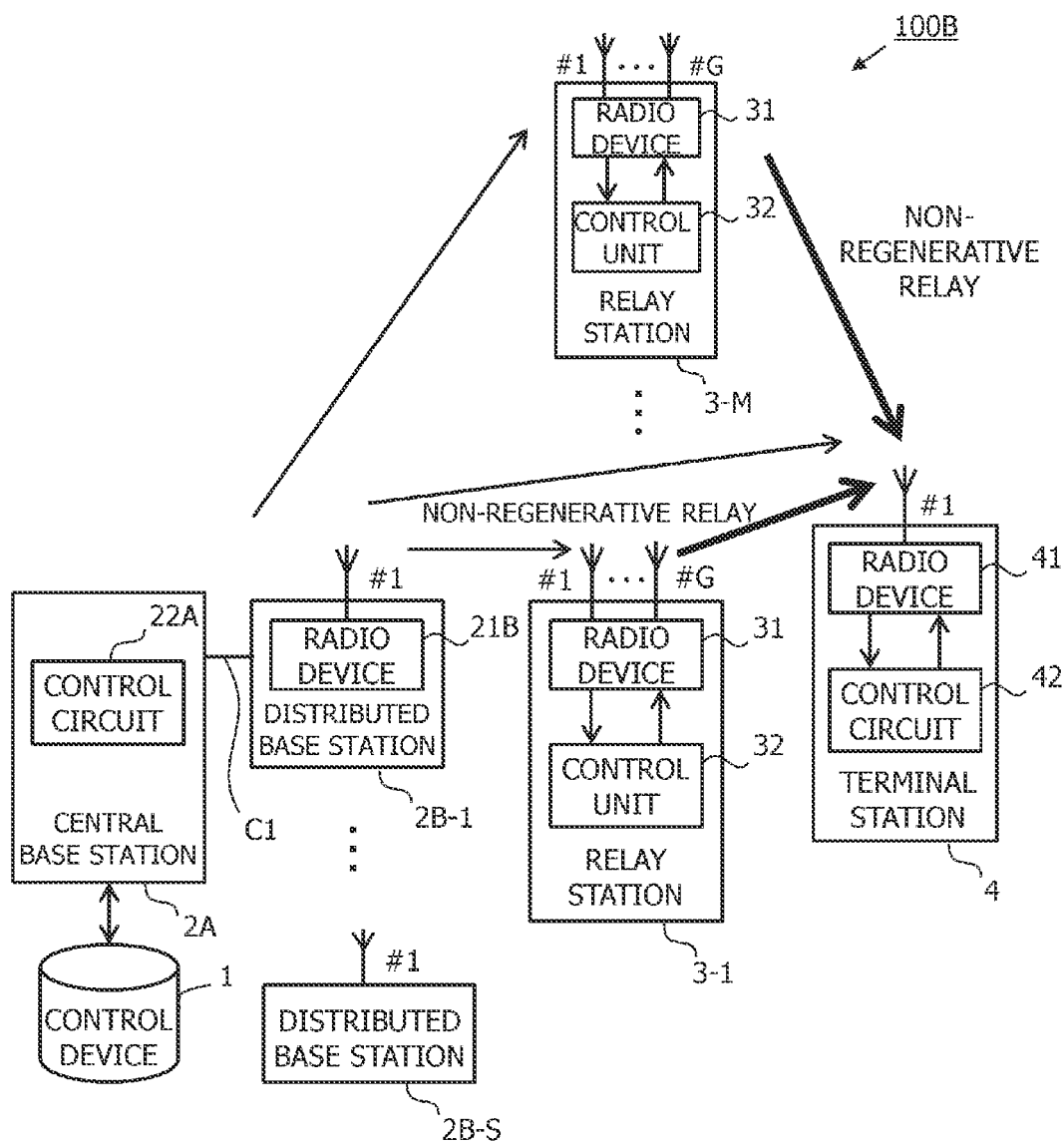
FIG. 2 is a diagram illustrating an example of a system configuration of a communication system.

FIG. 2 is a diagram illustrating an example of a system configuration of a communication system 100B. In the first embodiment, the system configuration may be referred to as the communication system 100B. In comparison with the communication system 100A in FIG. 1, the communication system 100B includes a central base station 2A and one or more distributed base stations 2B instead of the base station 2. When the one or more distributed base stations 2B are individually distinguished, branch numbers are attached like the distributed base stations 2B-1, . . . , 2B-S. Here, the branch number S is an integer indicating the number of distributed base stations. In FIG. 2, the distributed base stations 2B-1 and 2B-S are illustrated. When the distributed base stations 2B-1, . . . , 2B-S are generically mentioned, however, they will be referred to simply as the distributed base stations 2B.

The central base station 2A includes a control circuit 22A. The distributed base stations 2B include radio devices 21B, respectively. The control circuit 22A of the central base station 2A and the radio devices 21B of the distributed base stations 2B are connected, for example, via an optical fiber C1 or a wireless network. The topology of the optical fiber C1 connecting the central base station 2A and the plurality of distributed base stations 2B is not limited to a particular topology. For example, the topology of the optical fiber C1 may be one-to-one connection between nodes, a network that branches as being away from the central base station 2A, a star network, or a ring network. Further, in the case of connecting the control circuit 22A of the central base station 2A and the radio devices 21B of the distributed base stations 2B via a wireless network, a standard and protocol of a wireless network to be adopted are not limited to a particular standard and protocol.

Similarly to the control circuit 22 of FIG. 1, the control circuit 22A includes a processor and a memory. The processor controls communication with the control apparatus 1 and wireless communication with the relay stations 3 and the terminal station 4, by a computer program on the memory. That is, the control circuit 22A controls wireless communication with the relay stations 3 and the terminal station 4 via the radio devices 21B of the one or more distributed base stations 2B.

In the communication systems 100A and 100B, the control unit 32 of the relay station may be provided with an antenna for a control channel separately from the antennas #1 to #G. Hereinafter, when the communication system 100A and the communication system 100B are not distinguished, they will be referred to simply as the communication systems 100.

In the first embodiment, it is assumed that the following are adopted in the communication systems 100. In the communication systems 100, time division multiplexing is adopted, and channels with the same frequency are used for an uplink and a downlink. Further, slot timings of wireless frames are synchronized among the base station 2, the relay stations 3, and the terminal station 4. In the communication systems 100, a block transmission method using a cyclic prefix, such as CP-OFDM (cyclic prefix-orthogonal frequency division multiplexing), is adopted as a wireless modulation method. The relay station 3 shares resource block information that the relay-target terminal station 4 uses in the uplink and the down link. The uplink is a communication link in a direction from the terminal station 4 to the base station 2. The downlink is a communication link in a direction from the base station 2 to the terminal station 4. Hereinafter, a downlink direction and an uplink direction may be also referred to as a down direction and an up direction, respectively.

In the first embodiment, each relay station 3 receives a beam pattern set from the control apparatus 1, selects such a beam pattern that causes the SINR to be the largest, from among a plurality of beam patterns included in the beam pattern set, and performs update with the beam pattern. The SINR of a received signal from the terminal station 4 is calculated in consideration of effects of self-interference due to non-regenerative relay. Thereby, the relay station can update a beam pattern at an interval shorter than a wireless frame, and stably provide communication by non-regenerative relay even when the terminal station 4 is moving at a high speed.

Figure 3:
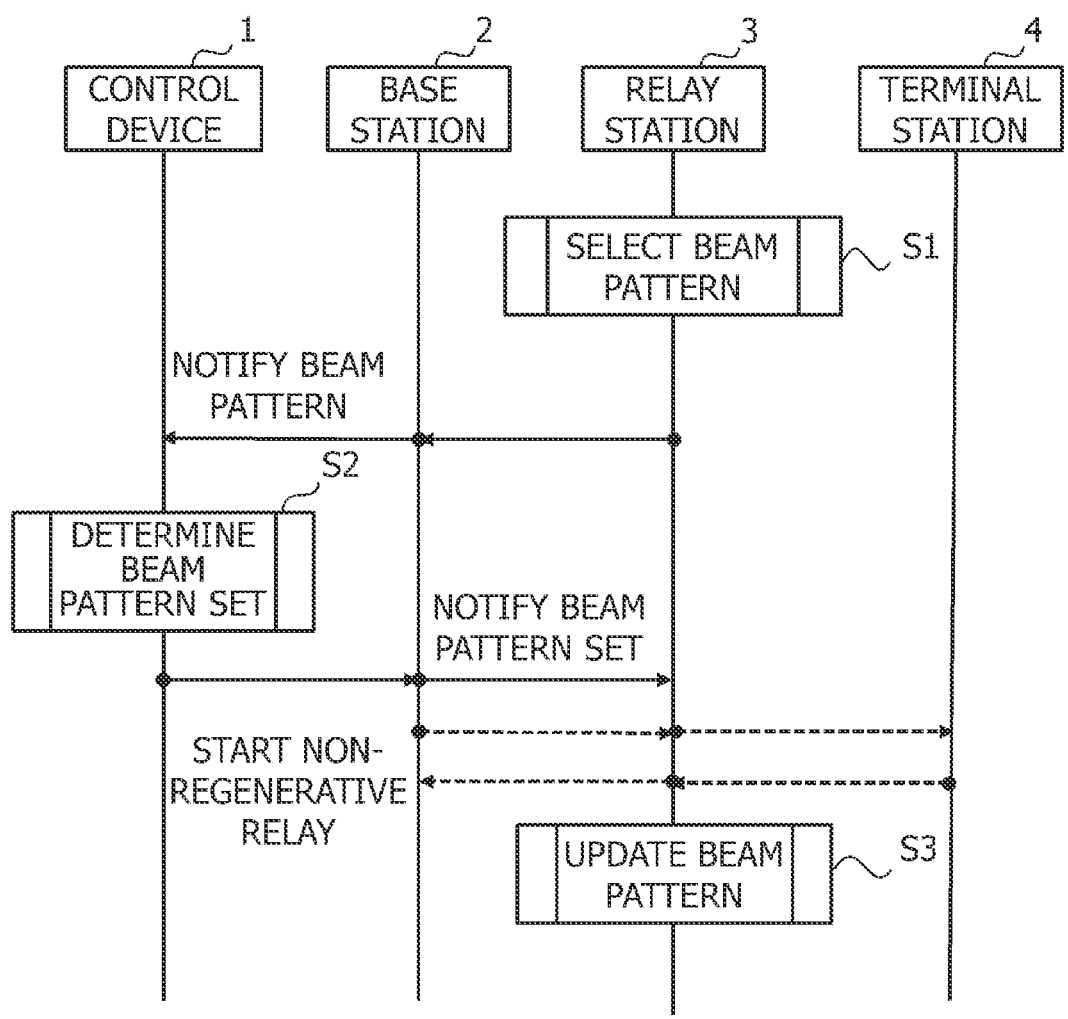
FIG. 3 is a diagram illustrating an example of a sequence of a process related to update of a beam pattern by each relay station in each communication system according to the first embodiment.

FIG. 3 is a diagram illustrating an example of a sequence of a process related to update of a beam pattern by each relay station 3 in each communication system 100 according to the first embodiment. In FIG. 3, a flow of processes of S1 to S3 is illustrated, and details of each process will be described later.

At S1, the relay station 3 executes a beam pattern selection process in a predetermined uplink slot in a wireless frame. In the beam pattern selection process at S1, the relay station 3 selects a beam pattern in which the SINR of a received signal from the terminal station 4 is the largest, from a beam pattern set that has been set in advance, and notifies the control apparatus 1 of the beam pattern and the largest SINR in the beam pattern. Hereinafter, it is assumed that, when simply SINR is mentioned, it refers to the SINR of a received signal from the terminal station 4.

At S2, the control apparatus 1 executes a beam pattern set determination process for determining a beam pattern set to be assigned to the relay station 3. In the beam pattern set determination process at S2, the control apparatus 1 determines the beam pattern set to be assigned to the relay station 3 based on the beam pattern notified from the relay station 3, and notifies the relay station 3 of the beam pattern set.

The relay station 3 performs non-regenerative relay using a beam pattern included in the beam pattern set notified from the control apparatus 1. At S3, the relay station 3 performs a beam pattern update process. In the beam pattern update process at S3, the relay station 3 monitors, for each beam pattern included in the beam pattern set, the SINR for each symbol, selects such a beam pattern that the SINR is the largest, and updates a beam pattern with the beam pattern. Though the control apparatus 1 executes the beam pattern set determination process of S2 in FIG. 3, the base station 2 may execute the beam pattern set determination process.

Figure 4:
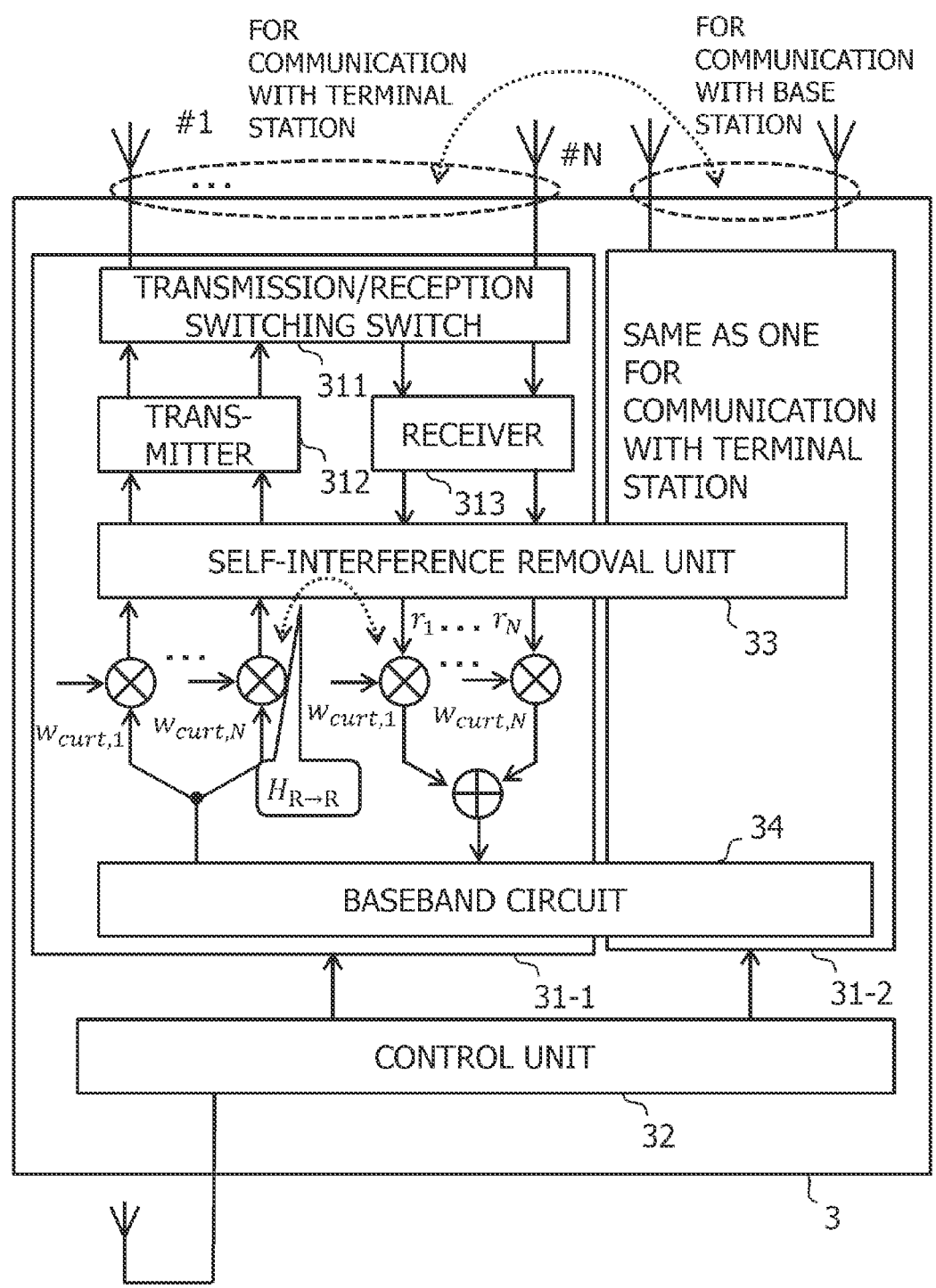
FIG. 4 is a diagram illustrating an example of a hardware configuration of each relay station.

FIG. 4 is a diagram illustrating an example of a hardware configuration of each relay station 3. The relay station 3 is provided with radio devices 31-1 and 31-2, a control unit 32, a self-interference removal unit 33, and a baseband circuit 34. The radio device 31-1 are connected to antennas #1 to #N for communication with the terminal station. The radio device 31-2 is connected to one or more antennas for communication with the control apparatus 1. The radio devices 31-1 and 31-2 have the same configuration. When the radio devices 31-1 and 31-2 are generically mentioned, they will be referred to simply as the radio devices 31. The total of the number N of antennas for communication with the terminal station and the number of the one or more antennas for communication with the control apparatus 1 is the number G of antennas held by the relay station 3. That is, N<G is satisfied. Hereinafter, the radio device 31-1 that is connected to the antennas #1 to #N for communication with the terminal station will be representatively described.

The radio device 31-1 is provided with a transmission/reception switching switch 311, a transmitter 312, and a receiver 313, and, additionally, multipliers and adders. The transmission/reception switching switch 311 is a switch that switches transmission and reception of the antennas #1 to #N. The transmission/reception switching switch 311 is connected to any of the transmitter 312 and the receiver 313. By the transmission/reception switching switch 311 being connected to the transmitter 312, the antennas and the transmitter 312 are connected, and the antennas operate as transmission antennas. By the transmission/reception switching switch 311 being connected to the receiver 313, the antennas are connected to the receiver 313, and the antennas operate as reception antennas. The switching of connection of the transmission/reception switching switch 311 of the radio device 31-1 is performed according to an instruction from the control unit 32.

When the receiver 313 is connected to the antennas by the transmission/reception switching switch 311, the receiver 313 receives a received signal from the antennas. The receiver 313 includes a quadrature detection circuit and an analog/digital (AD) converter. The receiver 313 down-converts the received signal by the quadrature detection circuit and further converts the received signal to digital data by the AD converter to obtain a baseband signal. The receiver 313 outputs the obtained baseband signal to the self-interference removal unit 33.

Here, the antennas for communication with the terminal station that are connected to the radio device 31-1 operate as reception antennas that receive a signal from the terminal station 4 in communication in the uplink direction. The antennas for communication with the base station 2 that are connected to the radio device 31-2 operate as transmission antennas that transmit a signal to the base station 2 in communication in the uplink direction. The antennas for communication with the terminal station that are connected to the radio device 31-1 operate as transmission antennas that transmit a signal to the terminal station 4 in communication in the downlink direction. The antennas for communication with the base station 2 that are connected to the radio device 31-2 operate as reception antennas that receive a signal from the base station 2 in communication in the downlink direction.

A power difference between a transmitted signal and a received signal of an antenna is, for example, approximately 100 dB. Therefore, between the antennas for communication with the terminal station and the antennas for communication with the base station 2, a part of a transmitted signal mutually interferes with a received signal. The interference between a part of a transmitted signal and a received signal at the relay station 3 is referred to as self-interference. Since the power of a transmitted signal is larger than that of a received signal, effects of self-interference on a transmitted signal by a received signal is negligible. Effects of self-interference on a wireless signal by a part of a transmitted signal, however, is not negligible, and the part of the transmitted signal becomes an interference signal for a received signal. Therefore, the part of the transmitted signal that becomes an interference signal for the received signal due to the self-interference is suppressed by using a radio frequency (RF) analog filter in the quadrature detection circuit in the receiver 313 and an FIR filter in the self-interference removal unit 33 together.

The self-interference removal unit 33 includes the FIR filter. The self-interference removal unit 33 suppresses the part of the transmitted signal mixed with and interfering with the received signal by the FIR filter. The self-interference removal unit 33 outputs the received signal filtered by the FIR filter to the baseband circuit 34.

The received signal output from the self-interference removal unit 33 is weighted by a reception-side multiplier corresponding to the antenna #n with a weight w_(curt, n) for generating a beam pattern in use p_(j, curt), the weight w_(curt, n) corresponding to the antenna #n. Here, n is a variable indicating each antenna; n takes a value of n=1, . . . , N; N indicates the number of antennas for communication with the terminal station 4; p_(j, curt) indicates a beam pattern that is currently (curt. which is an abbreviation of current) in use at a relay station j; and w_(curt, n) indicates a weight corresponding to the antenna #n in the beam pattern p_(j, curt). The weight w is a complex number. Characters in parentheses after an underline following an alphabet indicating a beam pattern, a weight or the like are expressed as subscripts in drawings. Each of received signals of the antennas #1 to #N that are weighted with the weights is then added by an adder and output to the baseband circuit 34.

The baseband circuit 34 generally performs demodulation, decoding, and the like for a received signal which is a baseband signal. In non-regenerative relay, however, the baseband circuit 34 outputs a received signal which is a baseband signal to the radio device 31 connected to the transmission antennas as it is. For example, a received signal received from the antennas for communication with the terminal station is output to the radio device 31-2 connected to the antennas for communication with the base station 2, by the baseband circuit 34. For example, a received signal received from the antennas for communication with the base station 2 is output to the radio device 31-1 connected to the antennas for communication with the terminal station, by the baseband circuit 34.

Next, description will be made on the transmission side of the radio device 31-1 in a case where a received signal received from the antennas for communication with the base station 2 is output to the radio device 31-1 connected to the antennas for communication with the terminal station, by the baseband circuit 34 and transmitted from the relay station 3 as a transmitted signal. The transmitted signal output from the baseband circuit 34 is demultiplexed, and each signal is weighted by a transmission-side multiplier corresponding to the antenna #n with the weight w_(curt, n) for generating the beam pattern in use p_(j, curt), the weight w_(curt, n) corresponding to the antenna #n. Then, each of transmitted signals weighted with the weights, respectively, is output to the transmitter 312. Though the transmitted signals are output from the transmission-side multipliers to the transmitter 312 via the self-interference removal unit 33 in FIG. 4 for convenience, suppression of self-interference is actually not performed for the transmitted signals.

The transmitter 312 includes a digital/analog (DA) converter, a demodulation circuit, and an amplification circuit. When being connected to antennas via a switch, the transmitter 312 receives input of a transmitted signal from the baseband circuit 34 via the transmission-side multipliers and the self-interference removal unit 33. The transmitter 312 converts the transmitted signal to an analog signal and generates an RF signal by the demodulation circuit. Further, the transmitter 312 amplifies the power (amplitude) of the RF signal by the amplification circuit. The transmitter 312 transmits the RF signal from the antennas connected by the transmission/reception switching switch 311, as a relayed signal.

The control unit 32 is, for example, a processor such as a CPU or a DSP (Digital Signal Processor) or an arithmetic circuit such as an FPGA. The control unit 32 performs control of a non-regenerative relay process. More specifically, the control unit 32 measures radio wave propagation characteristics of a propagation path, calculates the SINR for each beam pattern, notifies the control apparatus 1 of a beam pattern and the SINR thereof, via the control channel, and updates a beam pattern. The control unit 32 is an example of the "controller" of the "relay station".

The hardware configuration of the relay station 3 is not limited to that illustrated in FIG. 4. For example, though the relay station 3 is provided with an antenna for the control channel connected to the control unit 32 separately from the antennas #1 to #N for communication with the terminal station and the one or more antennas for communication with the base station, in FIG. 4, the relay station 3 is not limited thereto. For example, the relay station 3 may use any of the antennas #1 to #G as the antenna for the control channel without the control unit 32 being provided with the antenna for the control channel.

Figure 5:
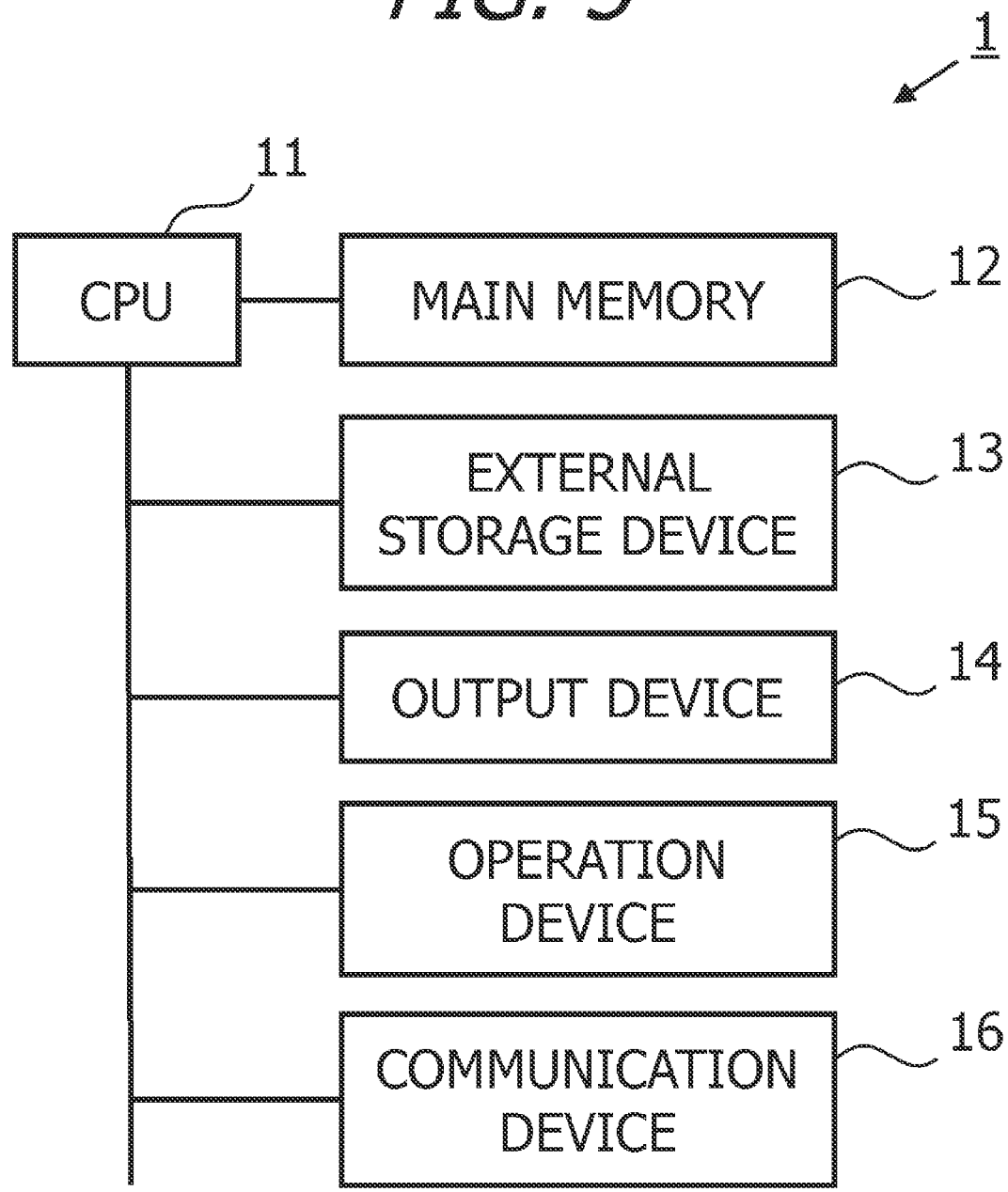
FIG. 5 is a diagram illustrating a hardware configuration of the control apparatus.

FIG. 5 is a diagram illustrating a hardware configuration of the control apparatus 1. The control apparatus 1 includes a CPU 11, a main memory 12, and external equipment, and executes communication processing and information processing by a computer program. The CPU 11 is also referred to as a processor. The CPU 11 is not limited to a single processor but may be in a multi-processor configuration. Further, the CPU 11 may include a graphics processing unit (GPU), a digital signal processor (DPS), and the like. Further, the CPU 11 may cooperate with a hardware circuit such as a field programmable gate array (FPGA). As the external equipment, an external storage device 13, an output device 14, an operation device 15, and a communication device 16 are exemplified.

The CPU 11 executes the computer program executably developed on the main memory 12 and provides the processing of the control apparatus 1. The main memory 12 stores the computer program executed by the CPU 11, and data and the like processed by the CPU 11. The main memory 12 is a dynamic random access memory (DRAM), a static random access memory (SRAM), a read only memory (ROM), or the like. The external storage device 13 is used, for example, as a storage area assisting the main memory 12, and stores the computer program executed by the CPU 11, and the data and the like processed by the CPU

11. The external storage device 13 is a hard disk drive, a solid state drive (SSD), or the like. Furthermore, a drive device for a removable storage medium may be connected to the control apparatus 1. The removable storage medium is, for example, a Blu-ray Disc, a digital versatile disc (DVD), a compact disc (CD), or a flash memory card. The CPU 11 is an example of the "controller" of the "information processing apparatus".

The output device 14 is a display device, such as a liquid crystal display or an electroluminescent panel. The output device 14, however, may include a speaker or any other device that outputs sound. The operation device 15 is, for example, a touch panel with a touch sensor layered on a display. The communication device 16 communicates with the base station 2 and an external network such as the Internet via an optical fiber. The communication device 16 is, for example, a gateway that communicates with a gateway connected to the base station 2, and an external network such as the Internet. The communication device 16 may be one device or may be a combination of a plurality of devices. The hardware configuration of the control apparatus 1 is not limited to that illustrated in FIG. 5.

(Process of Relay Station 3 for Selecting Beam Pattern that Causes SINR to be the Largest)

Figure 6:
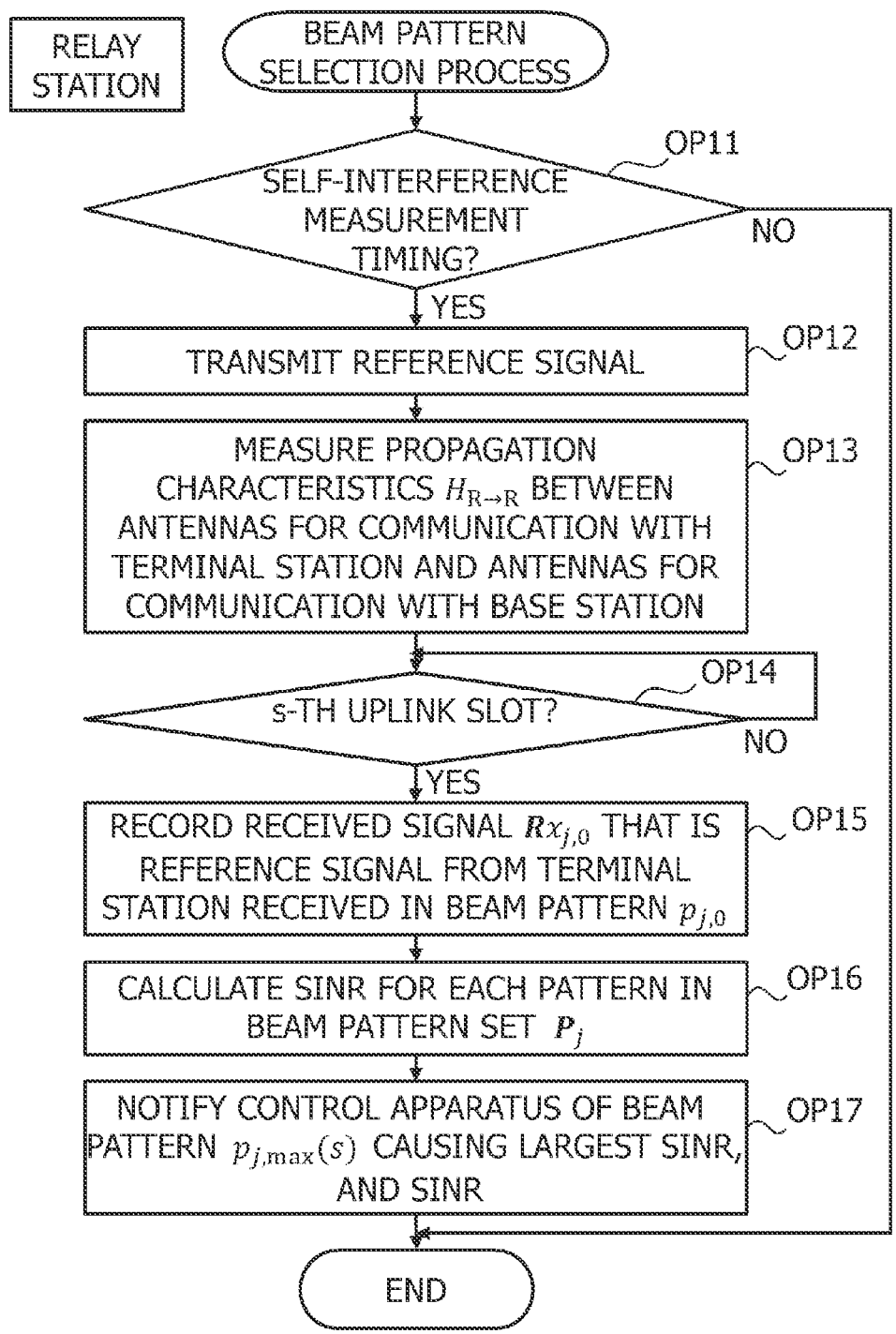
FIG. 6 illustrates an example of a flowchart of a beam pattern selection process of each relay station.

FIG. 6 illustrates an example of a flowchart of a beam pattern selection process of each relay station 3. The beam pattern selection process of the relay station 3 corresponds to the process executed at S1 in FIG. 3. The process illustrated in FIG. 6 is repeatedly executed in a predetermined cycle when the relay station 3 is instructed to perform relay to the terminal station 4 via the control channel, from the control apparatus 1.

At OP11, the control unit 32 determines whether a self-interference measurement timing has come or not. The self-interference measurement timing is, for example, notified from the control apparatus 1 via the control channel. If the self-interference measurement timing has come (OP11: YES), the process proceeds to OP12. If the self-interference measurement timing has not arrived yet (OP11: NO), the process illustrated in FIG. 6 ends.

At OP12, the control unit 32 transmits a reference signal from either the antennas for communication with the terminal station 4, which are connected to the radio device 31-1, or the antennas for communication with the base station 2, which are connected to the radio device 31-2. At OP13, the control unit 32 receives the reference signal transmitted at OP12 by the antennas for communication with the base station 2, which are connected to the radio device 31-2, or the antennas for communication with the terminal station 4, which are connected to the radio device 31-1, and measures propagation characteristics between the antennas for communication with the terminal station 4 and the antennas for communication with the base station 2.

The processes of OP12 and OP13 may be executed for all beam patterns included in a beam pattern set P_(j) for the antennas for communication with the terminal station 4 or may be executed for a part of the beam patterns. The beam pattern set P_(j) may be held by the control unit 32 in advance or may be notified from the control apparatus 1 in advance. When the processes of OP12 and OP13 are executed for a part of the beam patterns, the propagation characteristics between the antennas for communication with the terminal station 4 and the antennas for communication with the base station 2, for the other beam patterns, are complemented with propagation characteristics of a beam pattern that have been measured. For example, if an angle difference between beam directions of a beam pattern A and a beam pattern B is smaller than a predetermined value, and propagation characteristics of the beam pattern A have been measured, propagation characteristics of the beam pattern B may be approximated by the propagation characteristics of the beam pattern A.

At OP14, the control unit 32 determines whether the current period is the period of the s-th uplink slot specified from the control apparatus 1 or not. If the current period is the period of the s-th uplink slot (OP14: YES), the process proceeds to OP15. Until the period of the s-th uplink slot starts (OP14: NO), the control unit 32 is into a waiting state.

At OP15, the control unit 32 records a received signal vector Rx_(j, 0)={rx_(1), ..., rx_(N)} in a case of receiving the reference signal from the terminal station 4 in a beam pattern p_(j, 0). Here, rx(j, n) indicates a received signal of the antenna #n. The beam pattern p_(j, 0) is a beam pattern held by the control unit 32 or notified from the control apparatus 1 in advance. The received signal rx_(n) is a received signal output from the self-interference removal unit 33, which has been measured. Therefore, a value of power of the received signal rx_(n) is a value obtained by removing an amount of suppression of self-interference by the self-interference removal unit 33.

At OP16, an SINR is calculated for each beam pattern p_(j, d) included in the beam pattern set P_(j). Here, d is a variable indicating the beam pattern; d takes a value of d=1, ..., D; and D indicates the number of beam patterns included in the beam pattern set P_(j). The SINR Γ_(j, k) (p_(j, d)) in the case of the beam pattern p_(j, d) can be determined by Formula 1 below. Here, k is a variable indicating the terminal station 4.

$$\Gamma_{j,k}(p_{j,d}) = 10\log_{10} \frac{\left|\sum_{n=1}^{N} w_{d,n} r_n\right|^2 - I_j(p_{j,d})}{I_j(p_{j,d}) + W_j} [\text{dB}] \quad \text{(Formula 1)}$$

In the above formula, W_(j) indicates noise power at the relay station 3; and I_(j) (p_(j, d)) indicates self-interference power that remains in a received signal. The self-interference power is indicated by the propagation characteristics between the antennas for communication with the terminal station 4 and the antennas for communication with the base station 2, and the amount of suppression of self-interference by the self-interference removal unit 33 can be assumed as a fixed value. Therefore, the self-interference power that remains in the received signal can also be grasped as interference between an input signal (a transmitted signal) to the self-interference removal unit 33 and an output signal (a received signal) from the self-interference removal unit 33, between the baseband circuit 34 and the self-interference removal unit 33. When a propagation characteristic indicating combination of the input signal (the transmitted signal) to the self-interference removal unit 33 and the output signal (the received signal) from the self-interference removal unit 33 in the beam pattern p_(j, d) in this case is indicated by H_(R→R) (p_(j, d)), I_(j) (p_(j, d)) is indicated by Formula 2 below. Note that H_(R→R) (p_(j, d)) can be determined from the propagation characteristics between the antennas for communication with the terminal station 4 and the antennas for communication with the base station 2 in the beam pattern p_(j, d), and the amount of suppression of self-interference by the self-interference removal unit 33.

$$I_j(p_{j,d}) = P_{TX,j} |H_{R \to R}(p_{j,d})|^2 \quad \text{(Formula 2)}$$

In the above formula, P_(Tx, j) indicates power of a transmitted signal at the relay station 3.

At OP17, the control unit 32 notifies the control apparatus 1 of a beam pattern p_(j, max) (s) that causes the SINR to be the largest among the plurality of beam patterns p_(j, d) included in the beam pattern set P_(j), which has been determined at OP16, and the SINR. Here, s is a variable indicating a slot in a wireless frame. After that, the process illustrated in FIG. 6 ends. The beam pattern selection process of the relay station 3 illustrated in FIG. 6 is an example, and the beam pattern selection process of the relay station 3 is not limited to the process illustrated in FIG. 6. For example, the SINR in each beam pattern may be calculated using a received signal of the antenna #n, propagation characteristics between the antennas for communication with the terminal station 4 and the antennas for communication with the base station 2 in the beam pattern, the amount of suppression of self-interference by the self-interference removal unit 33, and the noise power W_(j) at the relay station 3.

(Process of Control Apparatus 1 for Determining Beam Pattern Set to be Assigned to Relay Station 3)

Figure 7:
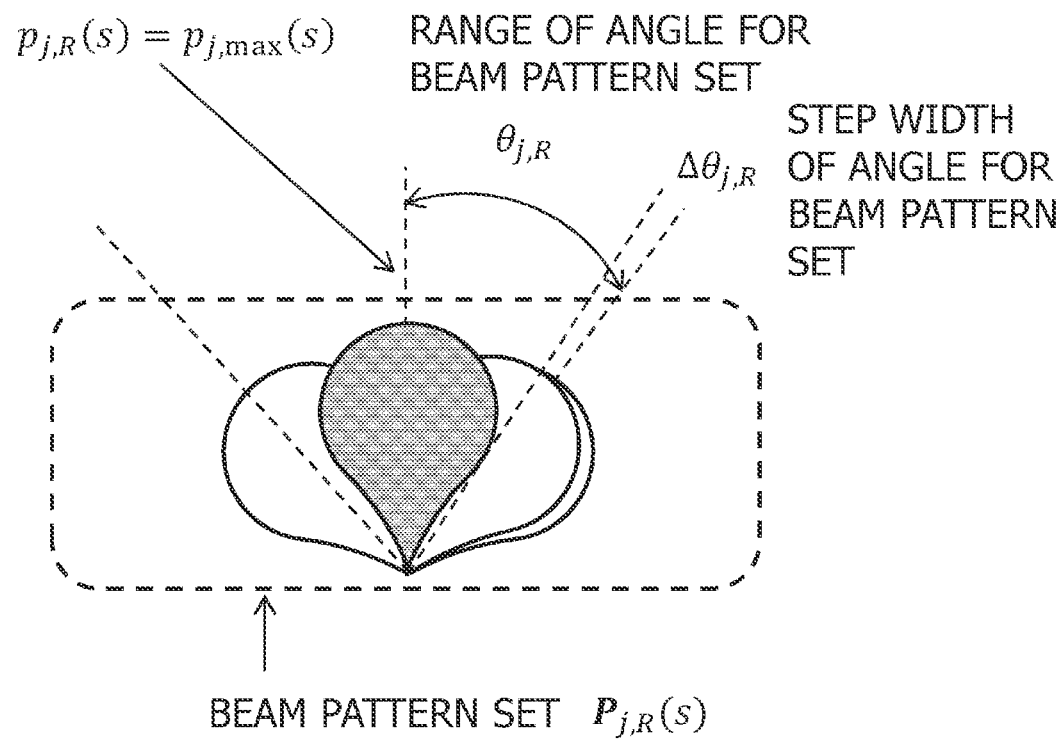
FIG. 7 is a diagram illustrating an example of relationships among a plurality of beam patterns included in a beam pattern set assigned to the relay station in the first embodiment.

FIG. 7 is a diagram illustrating an example of relationships among a plurality of beam patterns included in a beam pattern set assigned to the relay station 3 in the first embodiment. The example illustrated in FIG. 7 illustrates beam patterns in an azimuth direction.

In the first embodiment, a beam pattern set P_(j, R) (s) to be assigned to the relay station 3 is defined by a beam pattern p_(j, R) (s) to be the center, θ_(j, R) defining a beam-direction angle range in positive and negative directions from the beam direction at the beam pattern p_(j, R) (s), and a step width Δθ_(j, R) between beam patterns. That is, in the first embodiment, θ_(j, R)/Δθ_(j, R)×2 beam patterns are included in the beam pattern set P_(j, R) (s) to be assigned to the relay station 3. The beam direction at a beam pattern refers to a direction in which, when the beam pattern is applied to an antenna, radio waves are collected, and the antenna gain is enhanced.

The beam pattern p_(j, R) (s) to be the center of the beam pattern set P_(j, R) (s) is set as the beam pattern p_(j, max) (s) notified from the relay station 3. Each of the beam-direction angle range ±θ_(j, R) and the step width Δθ_(j, R) is set to a value set in advance. By the beam directions of the plurality of beam patterns included in the beam pattern set P_(j, R) (s) being set to be at equal angular intervals with the step width Δθ_(j, R) as above, the relay station 3 can thoroughly search the beam-direction angle range ±θ_(j, R) for a better beam pattern.

Figure 8:
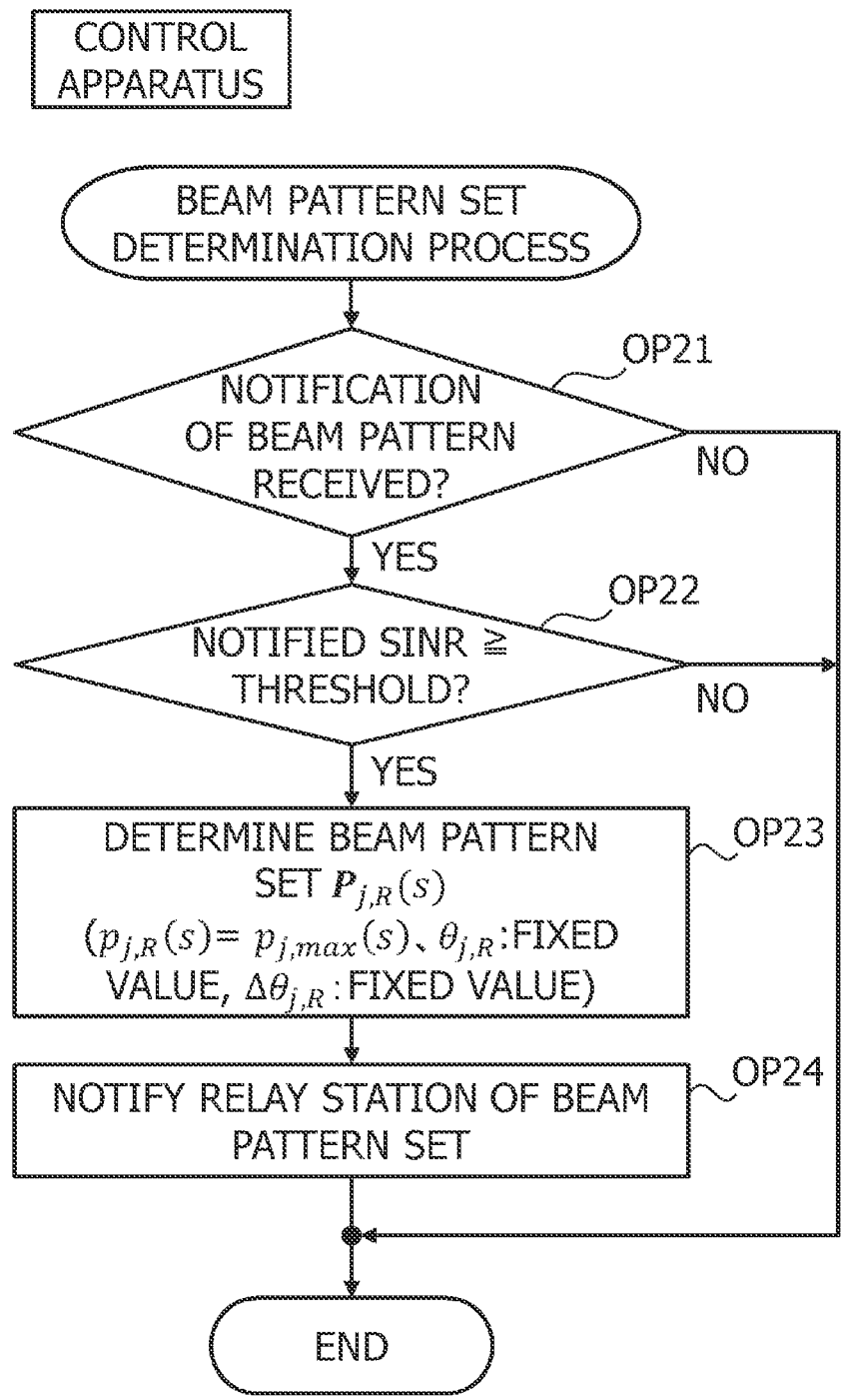
FIG. 8 illustrates an example of a flowchart of the beam pattern set determination process of the control apparatus in the first embodiment.

FIG. 8 illustrates an example of a flowchart of the beam pattern set determination process of the control apparatus 1 in the first embodiment. The process illustrated in FIG. 8 is repeatedly executed in a predetermined cycle. Though the entity to execute the process illustrated in FIG. 8 is the CPU 11 of the control apparatus 1, description will be made with the control apparatus 1 as the entity for convenience.

At OP21, the control apparatus 1 determines whether a notification of the beam pattern p_(j, max) (s) and the SINR at the beam pattern p_(j, max) (s) has been received from the relay station 3 or not. If the notification of the beam pattern p_(j, max) (s) and the SINR at the beam pattern p_(j, max) (s) has been received from the relay station 3 (OP21: YES), the process proceeds to OP22. If the notification of the beam pattern p_(j, max) (s) and the SINR at the beam pattern p_(j, max) (s) has not been received from the relay station 3 (OP21: NO), the process illustrated in FIG. 8 ends.

At OP22, the control apparatus 1 determines whether or not the SINR notified from the relay station 3 is equal to or above a threshold. The threshold is a threshold for determining whether or not to continue non-regenerative relay to the terminal station 4 by the relay station 3. If the SINR notified from the relay station 3 is equal to or above the threshold (OP22: YES), the process proceeds to OP23. If the SINR notified from the relay station 3 is below the threshold (OP22: NO), it is determined that it is not possible to continue the non-regenerative relay to the terminal station 4 by the relay station 3 no matter which beam pattern included in the beam pattern P_(j) is used, and the process illustrated in FIG. 8 ends.

At OP23, the control apparatus 1 determines the beam pattern set P_(j, R) (s) to be assigned to the relay station 3. The control apparatus 1 sets the beam pattern p_(j, R) (s) to be the center to p_(j, max) (s). The control apparatus 1 sets each of the beam-direction angle range ±θ_(j, R) and the step width Δθ_(j, R) to fixed values set in advance.

At OP24, the control apparatus 1 notifies the relay station 3 of information about the beam pattern set P_(j, R) (s). The information about the beam pattern set P_(j, R) (s) includes, for example, the beam pattern p_(j, R) (s) to be the center, the beam-direction angle range ±θ_(j, R), and the step width Δθ_(j, R). After that, the process illustrated in FIG. 8 ends. The information about the beam pattern set P_(j, R) (s) is an example of the "information about a beam pattern set". The beam pattern p_(j, max) (s) is an example of the "first beam pattern". The beam pattern p_(j, R) (s) is an example of the "third beam pattern". The beam-direction angle range is an example of the "first range". Further, θ_(j, R) defining the beam-direction angle range is an example of the "first angle". The step width Δθ_(j, R) is an example of the "second angle".

The definition of the beam pattern set P_(j, R) (s) notified to the relay station 3, which is illustrated in FIGS. 7 and 8, is an example, and the definition of the beam pattern set P_(j, R) (s) is not limited to the example illustrated in FIG. 7. For example, as the beam pattern set P_(j, R) (s), a predetermined number of beam patterns the beam directions of which are included within the beam-direction angle range ±θ_(j, R) may be randomly determined. In this case, the information about the beam pattern set P_(j, R) (s) may include the beam pattern p_(j, R) (s) and the predetermined number of beam patterns included in the beam pattern set P_(j, R) (s). Further, as illustrated in FIG. 7, even when the beam pattern set P_(j, R) (s) to be notified to the relay station 3 is defined, the information about the beam pattern set P_(j, R) (s) to be notified to the relay station 3 may include, for example, the beam pattern p_(j, R) (s) and the plurality of beam patterns with the step width Δθ_(j, R), the beam directions of the beam patterns being included within the beam-direction angle range ±θ_(j, R).

(Beam Pattern Update Process by Relay Station 3)

Figure 9:
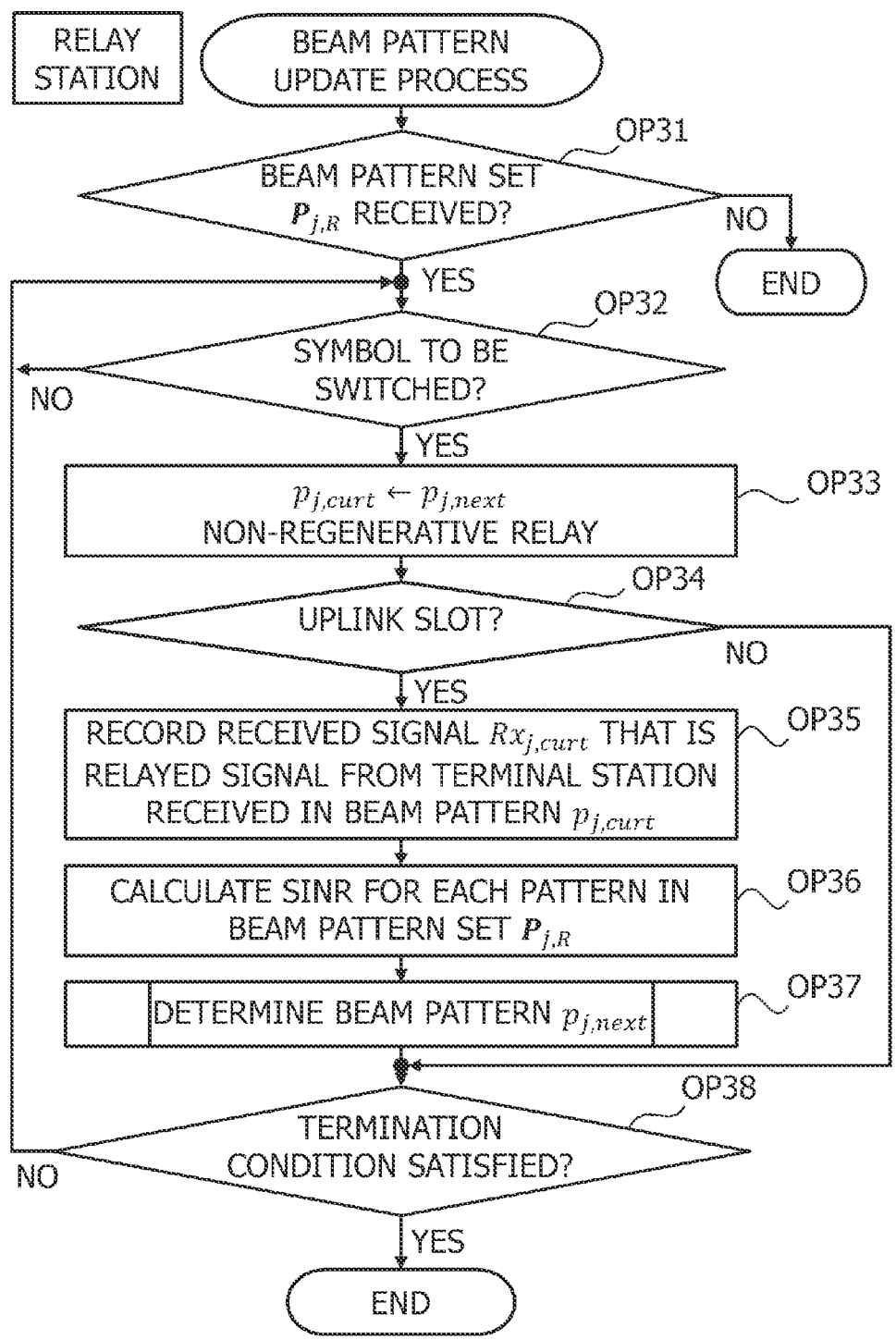
FIG. 9 illustrates an example of a flowchart of a beam pattern update process of each relay station in the first embodiment.

FIG. 9 illustrates an example of a flowchart of a beam pattern update process of each relay station 3 in the first embodiment. The process illustrated in FIG. 9 is the process executed at S3 of FIG. 3. The process illustrated in FIG. 9 is repeatedly executed in a predetermined cycle. The process illustrated in FIG. 9 may be started, for example, after the control apparatus 1 is notified of the beam pattern p_(j, max) (s) that causes the SINR to be the largest among the plurality of beam patterns p_(j, d) included in the beam pattern set P_(j), and the SINR in the beam pattern selection process.

At OP31, the control unit 32 determines whether the beam pattern set P_(j, R) (s) has been received from the control apparatus 1 or not. If the beam pattern set P_(j, R) (s) has been received from the control apparatus 1 (OP31: YES), the process proceeds to OP32. If the beam pattern set P_(j, R) (s) has not been received from the control apparatus 1 (OP31: NO), the process illustrated in FIG. 9 ends.

At OP32, the control unit 32 determines whether or not to switch the symbol. If the symbol is to be switched (OP32: YES), the process proceeds to OP33. If the symbol is not to be switched (OP32: NO), the control unit 32 is into a waiting state.

At OP33, the control unit 32 updates the beam pattern p_(j, curt) used by the antennas for communication with the terminal station 4 to a beam pattern p_(j, next), and starts non-regenerative relay. The initial value of p_(j, curt) is p_(j, 0). The initial value of p_(j, next) is the beam pattern p_(j, R) (s) included in the beam pattern set P_(j, R) (s).

At OP34, the control unit 32 determines whether the current period is the period of an uplink slot or not. If the current period is the period of an uplink slot (OP34: YES), the process proceeds to OP35. If it is not the period of an uplink slot period, that is, the current period is the period of a downlink slot (OP34: NO), the process proceeds to OP38.

The processes of OP35 to OP37 are executed if the current period is the period of an uplink slot. At OP35, the control unit 32 records Rx_(j, curt)={rx_(1), . . . , rx_(N)} that is a received signal vector in a case of receiving a relayed signal (a data signal) from the terminal station 4 at the beam pattern p_(j, curt). At OP36, an SINR is calculated for each beam pattern p_(j, d) included in the beam pattern set P_(j, R). The SINR Γ_(j, k) (p_(j, d)) at the beam pattern p_(j, d) can be determined by Formula 1 described above. A weight vector W_(j, d)={w_(j, 1), . . . , w_(j, n)} that generates each beam pattern p_(j, d) included in the beam pattern set P_(j, R) is acquired by the beam-direction angle of the beam pattern p_(j, d) being determined. The beam direction at each beam pattern p_(j, d) included in the beam pattern set P_(j, R) can be acquired with the beam pattern p_(j, R) (s), the beam-direction angle range ±θ_(j, R), and the step width Δθ_(j, R).

At OP37, the control unit 32 executes a beam pattern determination process for determining the beam pattern p_(j, next) to be used in the next symbol, based on the SINR at each beam pattern p_(j, d) calculated at OP36. Details of the beam pattern determination process will be described later.

At OP38, the controller 38 determines whether a condition for terminating the beam pattern update process has been satisfied or not. The condition for terminating the beam pattern update process is, for example, any or all of a period in a wireless frame specified by the control apparatus 1 having ended, an instruction to stop non-regenerative relay to the terminal stations 4 having been received from the control apparatus 1 via the control channel, and the like. If the condition for terminating the beam pattern update process is satisfied (OP38: YES), the process illustrated in FIG. 9 ends.

If the condition for terminating the beam pattern update process is not satisfied (OP38: NO), the process proceeds to OP32, where the beam pattern p_(j, curt) used for each symbol is updated to p_(j, next) (OP33). During the uplink slot period, the SINR is calculated for each beam pattern p_(j, d) included in the beam pattern set P_(j, R) (OP36), and the beam pattern p_(j, next) is determined (OP37). In a downlink slot period, since the processes of OP35 to OP37 are not executed, a beam pattern p_(j, next) determined in the last symbol in the immediately previous uplink slot is used to perform non-regenerative relay.

As for the beam pattern determination process at OP37, the following methods exist: (1) a method using a moving average window; and (2) a method using switch and stay. Which of (1) the method using a moving average window and (2) the method using switch and stay is to be used can be arbitrarily set by an administrator of each communication system 100.

Figure 10:
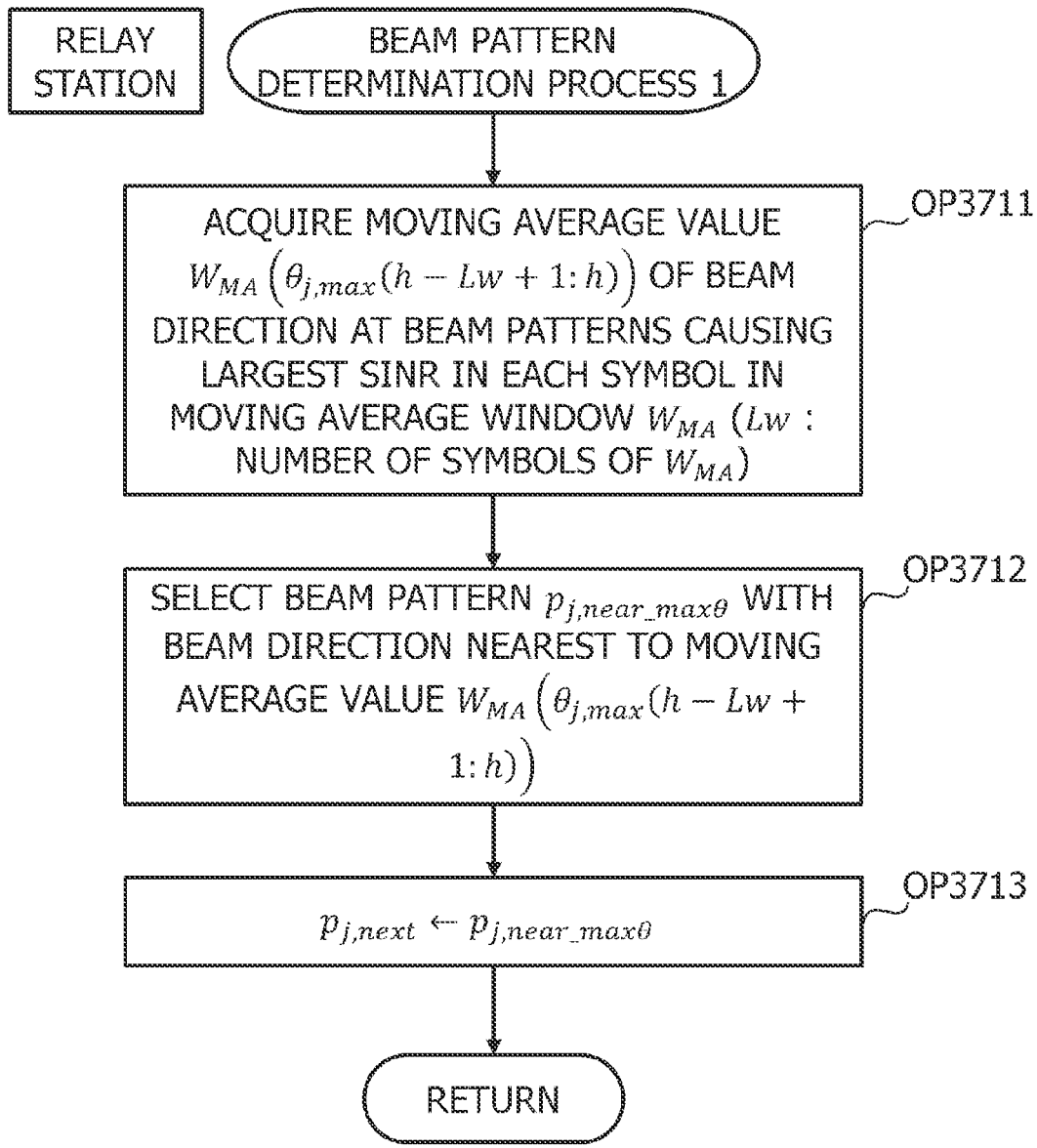
FIG. 10 is a flowchart of (1) the beam pattern determination process in the case of using a moving average window.

FIG. 10 is a flowchart of (1) the beam pattern determination process in the case of using a moving average window. The process illustrated in FIG. 10 may be one of the processes executed at OP37 of FIG. 9.

At OP3711, the control unit 32 acquires, in each of a plurality of symbols included in a moving average window W_(MA), a moving average value W_(MA) (θ_(j, max)) (h−Lw+1: h)) of a beam direction θ_(j, max) (h) at a beam pattern p_(j, max) (h) that causes the SINR to be the largest among the plurality of beam patterns included in the beam pattern set P_(j, R). Here, h is a variable indicating a symbol; and Lw indicates the number of symbols in the moving average window. For example, in a case of Lw=3, and a current symbol being indicated by #h, an average value of beam directions of θ_(j, max) (h−2), θ_(j, max) (h−1), and θ_(j, max) (h) that cause the SINR to be the largest in symbols #h−2 to #h, respectively, is determined as the moving average value W_(MA) (θ_(j, max) (h−Lw+1:h)).

At OP3712, the control unit 32 selects, from the beam pattern set P_(j, R), a beam pattern p_(j, near_maxθ) in which a beam direction nearest to the moving average value W_(MA) (θ_(j, max) (h−Lw+1:h)) can be obtained.

At OP3713, the control unit 32 sets the beam pattern p_(j, near_maxθ) in which the beam direction nearest to the moving average value W_(MA) (θ_(j, max) (h−Lw+1:h)) can be obtained, as the beam pattern p_(j, next) to be used in the next symbol. After that, the process proceeds to OP38 of FIG. 9.

For example, it is assumed that, in the case of Lw=3, the beam pattern that causes the SINR to be the largest is a beam pattern p_(j, D) in all of the symbols #h−2 to #h+2. In this case, in three symbols #h+1 to #h+3, the beam pattern p_(j, D) is the beam pattern in use p_(j, curt). Further, for example, if, even in a situation in which the beam pattern that causes the SINR to be the largest changes among the symbols, the beam pattern p_(j, near_maxθ) in which a beam direction nearest to the moving average value W_(MA) (θ_(j, max) (h−Lw+1:h)) can be obtained is the beam pattern p_(j, D) through the symbols #h−2 to #h+2, then the beam pattern p_(j, D) is the beam pattern in use p_(j, curt) in the three symbols #h+1 to #h+3. Thus, by using a moving average window, it is possible to prevent the cycle of change of the beam pattern in use p_(j, curt) from being too short.

Figure 11:
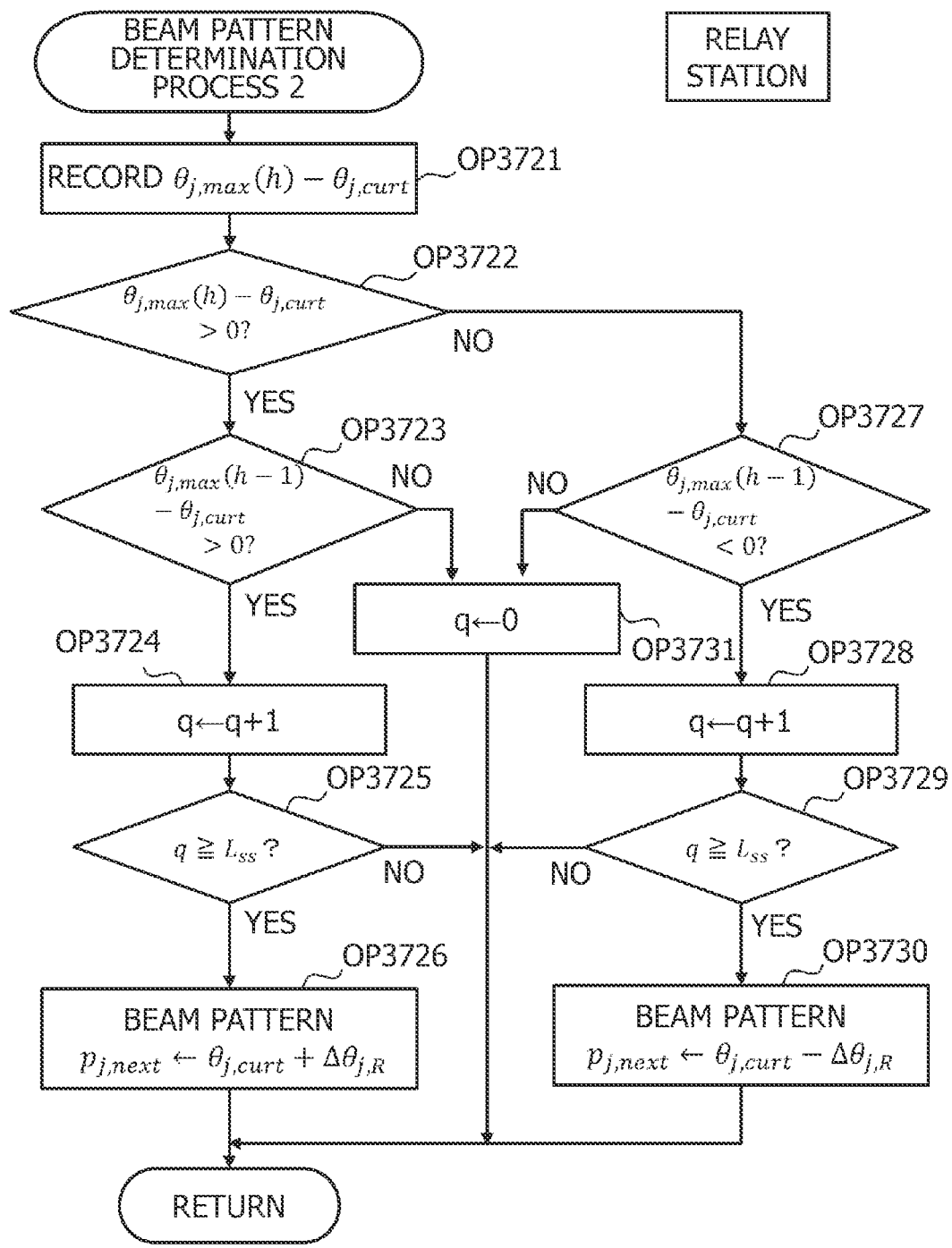
FIG. 11 is a flowchart of (2) the beam pattern determination process in the case of using switch and stay.

FIG. 11 is a flowchart of (2) the beam pattern determination process in the case of using switch and stay. In (2) the beam pattern determination process in the case of using switch and stay, when the beam direction θ_(j, max) (h) at the beam pattern p_(j, max) (h) that causes the SINR to be the largest is positive or negative relative to the beam direction θ_(j, curt) at the current beam pattern p_(j, curt) in consecutive Lss symbols, p_(j, next) is updated to a beam pattern obtained by moving the beam direction continuously in the positive or negative direction. The process illustrated in FIG. 11 may be one of the processes executed at OP37 of FIG. 9.

At OP3721, the control unit 32 records a value obtained by subtracting the beam direction θ_(j, curt) at the current beam pattern p_(j, curt) from the beam direction θ_(j, max) (h) at the beam pattern p_(j, max) (h) that causes the SINR to be the largest in the current symbol #h. That is, at OP3721, it is recorded whether the beam direction θ_(j, max) (h) at the beam pattern p_(j, max) (h) that causes the SINR to be the largest in the current symbol #h is positive or negative relative to the beam direction θ_(j, curt) at the current beam pattern p_(j, curt).

At OP3722, the control unit 32 determines whether θ_(j, max) (h)−θ_(j, curt) is positive or negative. If θ_(j, max) (h)−θ_(j, curt) is positive (OP3722: YES), the process proceeds to OP3723.

At OP3723, the control unit 32 also determines whether, in the symbol #h−1 immediately before the current symbol #h, the beam direction θ_(j, max) (h−1) at the beam pattern p_(j, max) (h−1) that causes the SINR to be the largest, relative to the beam direction θ(j, curt) at the current beam pattern p_(j, curt) is positive or not. If θ_(j, max) (h−1)−θ_(j, curt) is not recorded, a negative judgment is made at OP3723.

If θ_(j, max) (h−1)−θ_(j, curt) is positive (OP3723: YES), the process proceeds to OP3724. At OP3724, the control unit 32 increments a variable q by 1. The variable q is a variable for counting the number of times the beam direction θ_(j, max) (h) of the beam pattern p_(j, max) (h) that causes the SINR to be the largest, is consecutively positive or negative relative to the beam direction θ_(j, curt) of the current beam pattern p_(j, curt). The initial value of q is 0, and, when the beam pattern update process of FIG. 9 ends, the value is cleared.

At OP3725, the control unit 32 determines whether or not the value of q is equal to or larger than Lss, that is, whether or not the beam direction θ_(j, max) (h) at the beam pattern p_(j, max) (h) that causes the SINR to be the largest has been consecutively positive Lss times or more relative to the beam direction θ_(j, curt) at the current beam pattern p_(j, curt). If the value of q is equal to or larger than Lss (OP3725: YES), the process proceeds to OP3726. If the value of q is smaller than Lss (OP3725: NO), p_(j, next) is not updated, the process illustrated in FIG. 11 ends and the process proceeds to OP38 of FIG. 9.

At OP3726, the control unit 32 sets p_(j, next) to a beam pattern the beam direction of which is a direction obtained by adding the step width Δθ_(j, R) to the beam direction θ_(j, curt) of the current beam pattern p_(j, curt). After that, the process illustrated in FIG. 11 ends, and the process proceeds to OP38 of FIG. 9.

Next, if θ_(j, max) (h)−θ_(j, curt) is negative or 0 (OP3722: NO), the process proceeds to OP3727. At OP3727, the control unit 32 determines whether, in the symbol #h−1 immediately before the current symbol #h, the beam direction θ_(j, max) (h−1) at the beam pattern p_(j, max) (h−1) that causes the SINR to be the largest, relative to the beam direction θ_(j, curt) at the current beam pattern p_(j, curt) is negative or not. If θ_(j, max) (h−1)−θ_(j, curt) is not recorded, a negative judgment is made at OP3727.

If θ_(j, max) (h−1)−θ_(j, curt) is negative (OP3727: YES), the process proceeds to OP3728. At OP3728, the control unit 32 increments the variable q by 1.

At OP3729, the control unit 32 determines whether or not the value of q is equal to or larger than Lss, that is, whether or not the beam direction θ_(j, max) (h) at the beam pattern p_(j, max) (h) that causes the SINR to be the largest has been consecutively negative Lss times or more relative to the beam direction θ_(j, curt) of the current beam pattern p_(j, curt). If the value of q is equal to or larger than Lss (OP3729: YES), the process proceeds to OP3730. If the value of q is smaller than Lss (OP3729: NO), p_(j, next) is not updated, the process illustrated in FIG. 11 ends and the process proceeds to OP38 of FIG. 9.

At OP3730, the control unit 32 sets p_(j, next) to a beam pattern the beam direction of which is a direction obtained by subtracting the step width Δθ_(j, R) from the beam direction θ(j, curt) of the current beam pattern p_(j, curt). After that, the process illustrated in FIG. 11 ends, and the process proceeds to OP38 of FIG. 9.

When θ_(j, max) (h−1)−θ_(j, curt) is negative or 0 at OP3723 (OP3723: NO), and when θ_(j, max) (h−1)−θ_(j, curt) is positive or 0 at OP 3727 (OP3727: NO), the process proceeds to OP3731. At OP3731, the control unit 32 sets q to the initial value 0. In this case, p_(j, next) is not updated, the process illustrated in FIG. 11 ends and the process proceeds to OP38 of FIG. 9.

If the beam direction θ_(j, max) (h) at the beam pattern p_(j, max) (h) that causes the SINR to be the largest is consecutively positive or negative Lss times or more relative to the beam direction θ (j, curt) at the current beam pattern p_(j, curt), it indicates that the terminal station 4 is moving at a high speed. In this case, by updating the beam pattern p_(j, next) to the beam pattern p_(j, curt) the beam direction of which has been moved by Δθ_(j, R) in the positive or negative direction, it is possible to perform update to a more optimal beam pattern in response to the high-speed movement of the terminal station 4.

The beam pattern update process of each relay station 3 is not limited to (1) the method using a moving average window; and (2) the method using switch and stay. For example, for each symbol, the beam pattern in use p_(j, curt) may be updated to a beam pattern included in the beam pattern set P_(j, R) that causes the SINR to be the largest.

(Method for Determining Lw and Lss)

As methods for determining the size Lw of the moving average window W_(MA) in (1) the beam pattern update process using a moving average window and Lss in (2) the beam pattern update process using switch and stay, for example, the following (A) to (C) are given.

(A) Lw and Lss are set to predetermined fixed values. For example, Lw and Lss are set to three symbols.

(B) Lw and Lss are set to the largest number of symbols corresponding to coherent time Tc (a time length in which characteristics of a propagation path can be regarded as the same) or shorter. For example, a quotient obtained by dividing the coherent time by the symbol time length is set as Lw and Lss. The coherent time Tc is calculated from a movement speed v_(UE) of the terminal station 4 and frequency used. As for the movement speed v_(UE) of the terminal station 4, a predetermined value may be used. The movement speed v_(UE) of the terminal station 4 may be calculated as an estimated value from the cyclic prefix of a received signal from the terminal station 4 in an immediately previous uplink slot. Alternatively, as for the movement speed v_(UE) of the terminal station 4, a value collected by a 5G core network from the terminal station 4 may be acquired from the 5G core network via a predetermined application and used.

(C) By using a regression equation for predicting a beam direction that causes the SINR to be the largest, Lw and Lss are set for the beam direction θ_(j, max) (h) acquired by the relay station 3 for each symbol, based on a deviation σ_(beam) from a beam direction determined by the regression equation and a target deviation σ_(error). In the regression equation, the beam direction θ_(j, max) (h) at the beam pattern that causes the SINR to be the largest in one symbol is an objective variable, and a symbol number h of the symbol is an explanatory variable. Further, fitting of the regression equation is performed (a coefficient of each term is determined) using a set of the beam direction θ_(j, max)

(h) obtained for each symbol at the time of the beam pattern update process using a moving average or switch and stay in an immediately previous uplink slot and the symbol number h of each symbol in the immediately previous uplink slot. Lw and Lss are determined, based on a deviation (square root of mean square error) σ_(beam) between an output value of a beam direction at the time of inputting the symbol number h of a current symbol in the current slot to the regression equation and the beam direction θ_(j, max) (h) obtained in the current symbol. For example, by multiplying the current values of Lw and Lss by the square of a quotient obtained by dividing σ_(beam) by σ_(error), Lw and Lss may be updated for each symbol.

Here, Lw and Lss are ones of parameters that effect the update interval (or frequency) of the beam pattern used by the antennas for communication with the terminal station 4. If Lw and Lss are too small or too large, communication becomes unstable. For example, by considering the movement speed of the terminal station 4 and considering the beam pattern causing the SINR to be the largest, which is acquired per symbol, and the SIRN in the beam pattern, Lw and Lss can be set to appropriate values, and stable communication can be provided.

Figure 12:
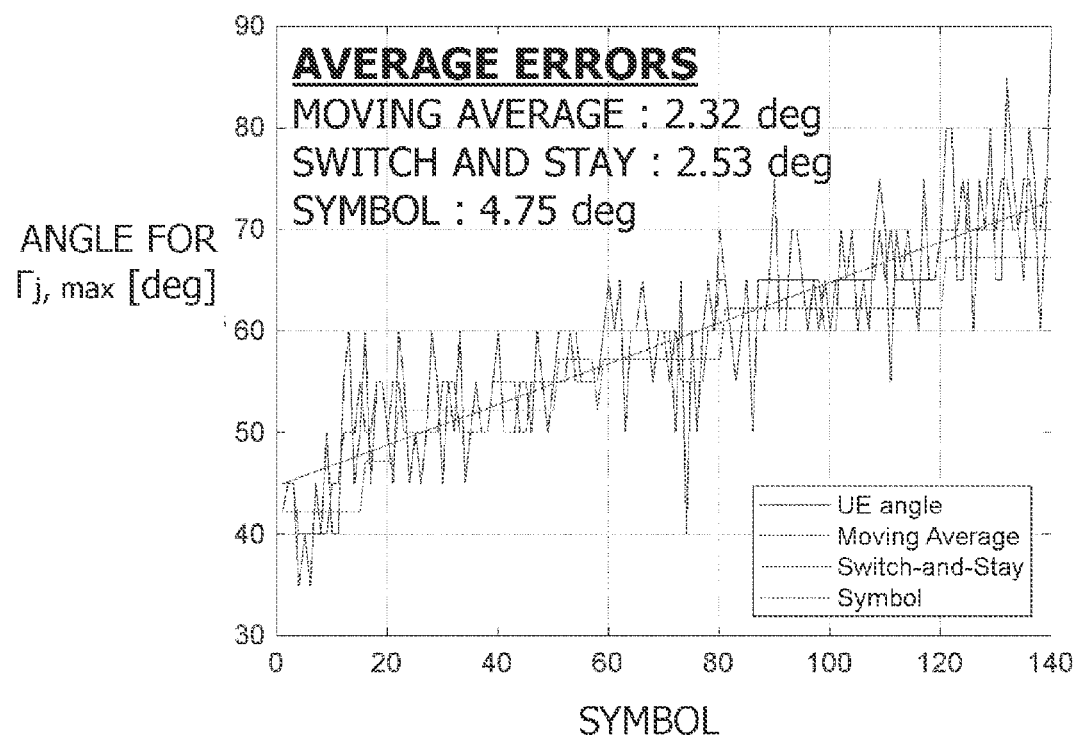
FIG. 12 illustrates an example of a simulation result of the beam pattern update process of communication system according to the first embodiment.

FIG. 12 illustrates an example of a simulation result of the beam pattern update process of communication system 100 according to the first embodiment. For graphs illustrated in FIG. 12, the horizontal axis indicates a symbol (time), and the vertical axis indicates an angle of a beam direction at a beam pattern that causes the SINR to be the largest in each symbol. In the example illustrated in FIG. 12, the beam-direction angle relative to the position of the terminal station 4 in each symbol, the beam-direction angle at a beam pattern in use in the case of performing update to the beam pattern that causes the SINR to be the largest, for each symbol, the beam-direction angle at the beam pattern in use in the case of updating a beam pattern by (1) the method of using a moving average window, and the beam-direction angle at the beam pattern in use in the case of updating a beam pattern by (2) method using switch and stay are illustrated.

In beam pattern update simulation by any of the methods, conditions for the movement speed and route of the terminal station 4, the transmission power of the relay station 3, and propagation path characteristics between the terminal station 4 and the relay station 3, and the like are the same.

Average angle errors in each symbol by the beam pattern update methods, relative to the beam-direction angle at a beam pattern in use in the case of updating a beam pattern for each symbol were 4.75 degrees in the case of performing update to a beam pattern that causes the SINR to be the largest for each symbol, 2.32 degrees in the case of updating a beam pattern by (1) the method using a moving average window, and 2.53 degrees in the case of updating a beam pattern by (2) the method using switch and stay. Therefore, in comparison with the case of performing update to the beam pattern that causes the SINR to be the largest for each symbol, the average error of the beam direction can be smaller, and communication by non-regenerative relay can be provided with a more stable quality by updating a beam pattern by (1) the method using a moving average window or (2) the method using switch and stay.

<Operation and Effects of First Embodiment>

According to the first embodiment, the beam pattern for the plurality of antennas of each relay station 3 for communication with the terminal station 4 can be updated for every one or more symbols. Thereby, even when the terminal station 4 moves at a high speed, it is possible to stably provide communication by non-regenerative relay. Further, update of a beam pattern is performed based on the SINR for each beam pattern which are included in a beam pattern set P_(j, R) calculated for each symbol. Furthermore, the beam pattern set P_(j, R) is acquired based on a beam pattern that causes the SINR to be the largest in a certain slot. The SINR at a beam pattern is calculated in consideration of effects of self-interference that occurs due to non-regenerative relay by the relay station 3. Therefore, according to the first embodiment, since the effects of self-interference by non-regenerative relay by the relay station 3 are also considered, the SINR at each beam pattern can be acquired more accurately. Thereby, it is possible to update a beam pattern in use with a beam pattern assuring that an SINR capable of stably continuing communication can be obtained.

Second Embodiment

In the first embodiment, after receiving a notification of the beam pattern set P_(j, R) from the control apparatus 1, the relay station 3 executes the beam pattern update process using the notified beam pattern set P_(j, R) until the termination condition is satisfied. In a second embodiment, the beam pattern set P_(j, R) assigned to the relay station 3 is updated based on a beam pattern the SINR of which is the largest SINR among beam patterns included in the beam pattern set P_(j, R), the largest SINR being calculated for each symbol. In the second embodiment, description common to the first embodiment will be omitted.

Figure 13:
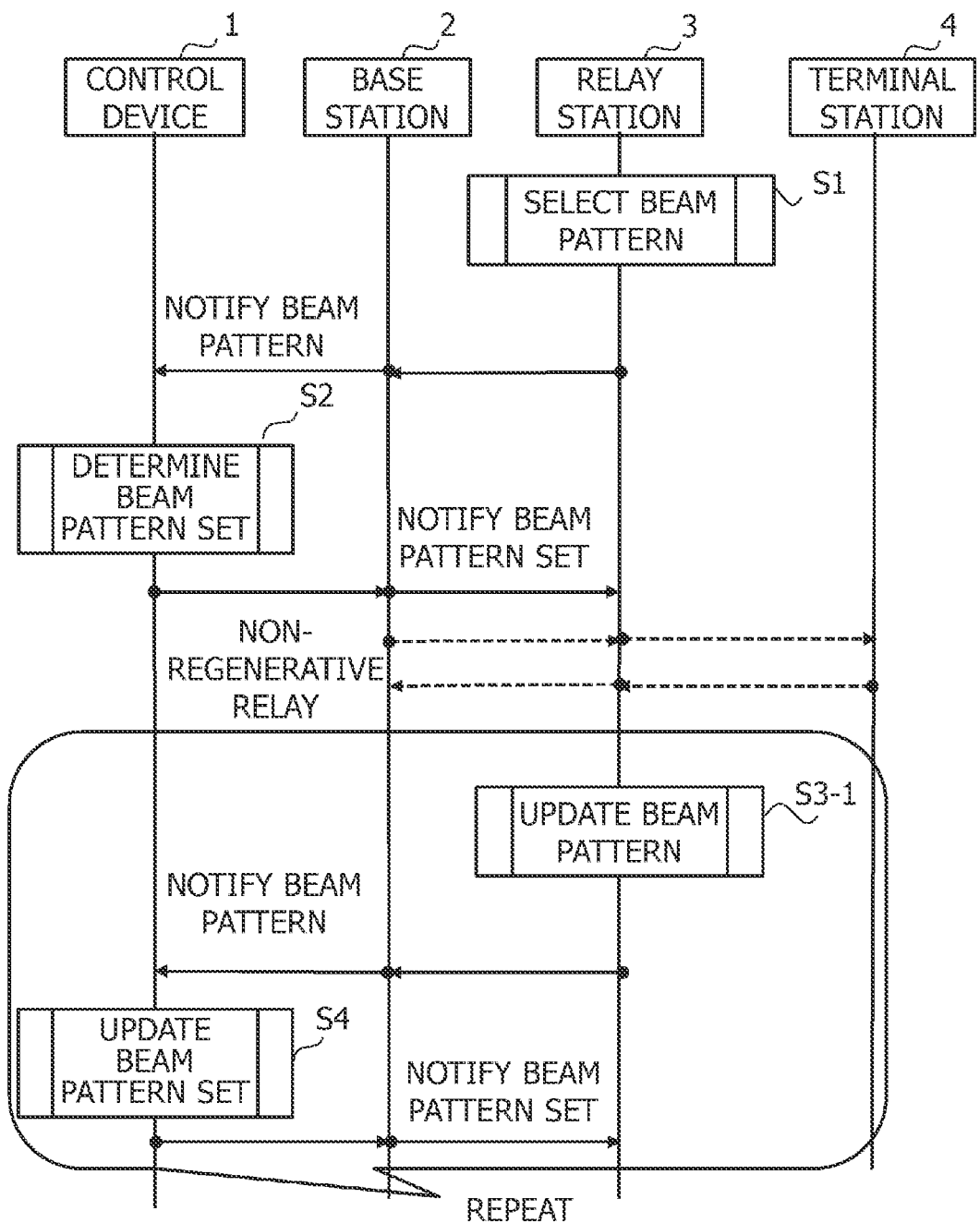
FIG. 13 is a diagram illustrating an example of a sequence of a process related to beam pattern update by each relay station in communication system according to the second embodiment.

FIG. 13 is a diagram illustrating an example of a sequence of a process related to beam pattern update by each relay station 3 in communication system 100 according to the second embodiment. In the second embodiment, a system configuration of the communication system 100, and configurations of the control apparatus 1, the base station 2, the relay station 3, and the terminal station 4 are similar to those of the first embodiment. The second embodiment is similar to the first embodiment in the flow until the process for selecting the beam pattern that causes the SINR to be the largest is performed by the relay station 3 at S1, and the process for determining the beam pattern set to be assigned to the relay station 3 is performed by the control apparatus 1 at S2.

In the second embodiment, after being notified of a beam pattern set from the control apparatus 1, at S3-1, the relay station 3 executes the beam pattern update process and notifies the control apparatus 1 of the beam pattern that causes the SINR to be the largest, at a predetermined timing. At S4, the control apparatus 1 executes a beam pattern set update process for updating the beam pattern set to be assigned to the relay station 3 based on the beam pattern that causes the SINR to be the largest, which has been notified from the relay station 3. In the second embodiment, until the condition for terminating the beam pattern update process is satisfied, the processes of S3-1 and S4 are repeatedly performed by the relay station 3 and the control apparatus 1.

Figure 14:
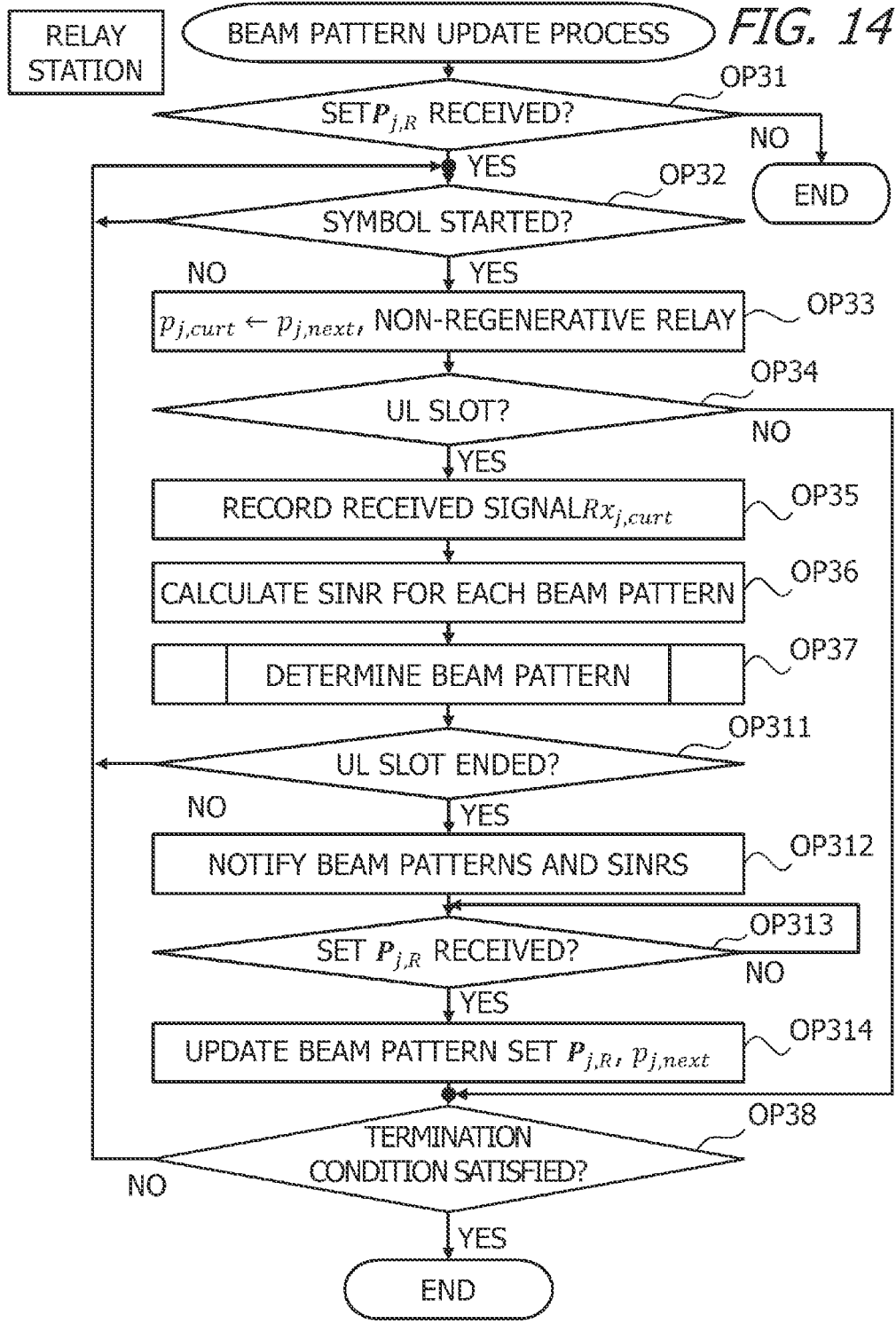
FIG. 14 illustrates an example of a flowchart of the beam pattern update process of each relay station in the second embodiment.

FIG. 14 illustrates an example of a flowchart of the beam pattern update process of each relay station 3 in the second embodiment. The process illustrated in FIG. 14 is the process executed at S3-1 of FIG. 13. The process illustrated in FIG. 14 is repeatedly executed in a predetermined cycle. In FIG. 14, the same processes as those of the beam pattern update process in the first embodiment in FIG. 9 are given the same reference signs.

Processes of OP31 to OP37 of receiving a beam pattern set P_(j, R) (s) from the control apparatus 1, and calculating an SINR for each beam pattern included in the beam pattern set P_(j, R) (s) in each symbol of an uplink slot to determine a beam pattern p_(j, next) to be used next are similar to those of the first embodiment.

At OP311, the control unit 32 determines whether the current symbol is a symbol at the end of the uplink slot or not. If the current symbol is the symbol at the end of the uplink slot (OP311: YES), the process proceeds to OP312. If the current symbol is not the symbol at the end of the uplink slot (OP311: NO), the process proceeds to OP32.

At OP312, the control unit 32 notifies the control apparatus 1 of such a beam pattern p_(j, max) (s) that the SINR becomes the largest the largest number of times (or with the highest frequency), among beam patterns included in the beam pattern set P_(j, R) (s), in each symbol in the uplink slot, and the largest SINR in the beam pattern.

At OP313, the control unit 32 determines whether a beam pattern set P_(j, R) (s) has been received from the control apparatus 1 or not. If a beam pattern set P (j, R) (s) has been received from the control apparatus 1 (OP313: YES), the process proceeds to OP314. If a beam pattern set P_(j, R) (s) has not been received from the control apparatus 1 (OP313: NO), the process is into a waiting state. For example, if a beam pattern set P_(j, R) (s) is not received from the control apparatus 1 even though a predetermined time has passed, the control unit 32 may advance the process to OP32.

At OP314, the control unit 32 updates the beam pattern set P_(j, R) (s) to the beam pattern set P_(j, R) (s) received from the control apparatus 1. Further, the beam pattern p_(j, next) to be used in the next symbol is updated to a beam pattern p_(j, R) (s) included in the beam pattern set P_(j, R) (s) received from the control apparatus 1. After that, the process proceeds to OP38.

If the termination condition is not satisfied (OP38: NO), a beam pattern in use p_(j, curt) is updated to a beam pattern p_(j, R) (s) included in the beam pattern set P_(j, R) (s) received at OP313, at the start of the immediately following symbol, and non-regenerative relay is performed. The beam pattern update process of the relay station 3 in the second embodiment illustrated in FIG. 14 is an example, and the beam pattern update process is not limited thereto. For example, the beam pattern which the control apparatus 1 is notified of at OP312 may be a beam pattern that causes the SINR to be the largest in the last symbol of the uplink slot.

(Process of Control Apparatus 1 for Updating Beam Pattern Set to be Assigned to Relay Station 3)

Figure 15:
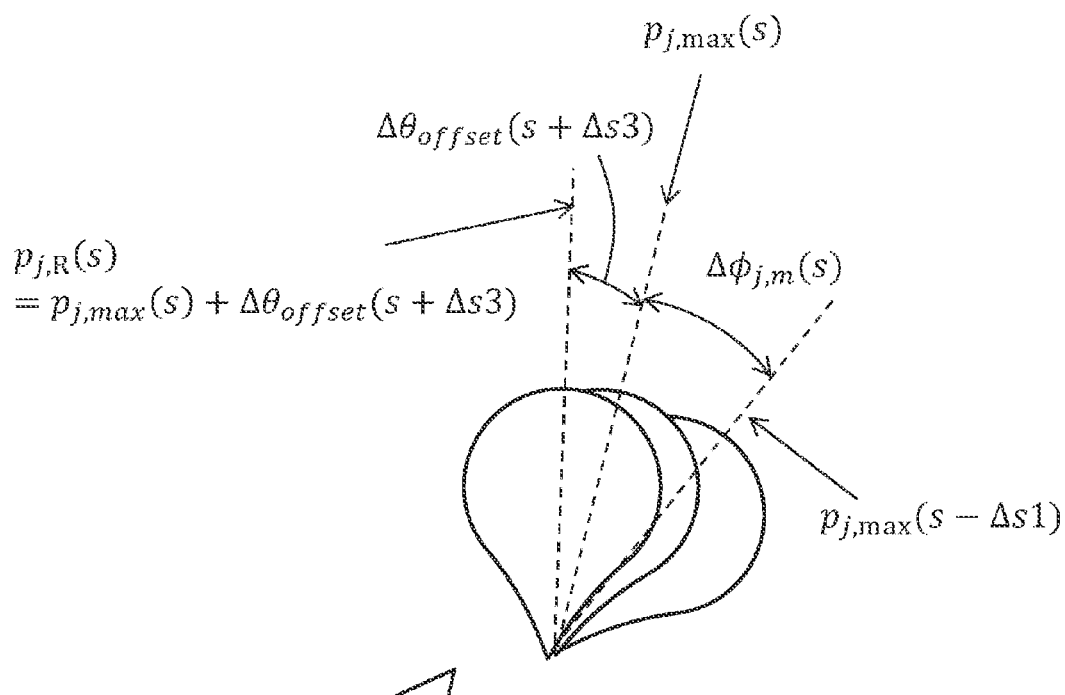
FIG. 15 is a diagram illustrating an example of relationships among a plurality of beam patterns used in the beam pattern set update process in the second embodiment.

FIG. 15 is a diagram illustrating an example of relationships among a plurality of beam patterns used in the beam pattern set update process in the second embodiment. The example illustrated in FIG. 15 illustrates beam patterns in an azimuth direction.

In FIG. 15, it is assumed that, in an s-th slot, the control apparatus 1 has received a notification of the beam pattern p_(j, max) (s) that causes the SINR to be the largest, from the relay station 3. It is assumed that a notification immediately before the notification has occurred in a (s−Δs1)-th slot. Further, it is assumed that the following notification is scheduled to be given in a (s+Δs2)-th slot. A beam pattern notified in the (s−Δs1)-th slot is indicated by p_(j, max) (s−Δs1). A beam pattern notified in the (s+Δs2)-th slot is indicated by p_(j, max) (s+Δs2).

In the second embodiment, based on a change from the beam pattern p_(j, max) (s−Δs1) to the beam pattern p_(j, max) (s), the control apparatus 1 sets a beam pattern p_(j, R) (s) to be the center, θ_(j, R) that defines a beam-direction angle range, and a step width Δθ_(j, R) between beam patterns. Since having specified a timing of notifying the beam pattern that causes the SINR to be the largest, to the relay station 3, the control apparatus 1 grasps a slot in which the notification is performed.

First, a change amount of the beam-direction angle caused by change from the beam pattern p_(j, max) (s−Δs1) to the beam pattern p_(j, max) (s) is indicated by Δφ_(j, m). A time length from the (s−Δs1)-th slot to the s-th slot is indicated by ΔT_(j, m). By dividing Δφ_(j, m) by ΔT_(j, m), a change amount per unit time in the beam direction at the beam pattern that causes the SINR to be the largest can be obtained. By multiplying the change amount per unit time in the beam direction at the beam pattern that causes the SINR to be the largest by a time length ΔT_(j, e) from the s-th slot to the (s+Δs2)-th slot, an estimated value of an change amount of the beam-direction angle caused by change from the beam pattern p_(j, max) (s) to the beam pattern p_(j, max) (s+Δs2) can be obtained. In the second embodiment, a range within which the beam direction at the beam pattern that causes the SINR to be the largest is estimated to change, between the s-th slot and the (s+Δs2)-th slot, is set as θ_(j, R) that defines the beam-direction angle range. That is, in the second embodiment, θ_(j, R) can be determined by Formula 3 below.

$$\theta_{j,R}(s) = \frac{\Delta T_{j,e}}{\Delta T_{j,m}} \Delta \phi_{j,m}(s) \quad \text{(Formula 3)}$$

$$\Delta \phi_{j,m}(s) = p_{j,max}(s) - p_{j,max}(s - \Delta s1)$$

A plurality of beam patterns included in the beam pattern set P_(j, R) (s) are set such that the beam directions are included within the beam-direction angle range θ_(j, R) at equal intervals. Therefore, the step width Δθ_(j, R) can be determined by dividing θ_(j, R) by the number of symbols Nsym included between the s-th slot and the (s+Δs2)-th slot as indicated by Formula 4 below.

$$\Delta \theta_{j,R}(s) = \frac{\theta_{j,R}(s)}{Nsym} \quad \text{(Formula 4)}$$

The beam pattern p_(j, R) (s) to be the center is determined in consideration of a change amount of the beam-direction angle at the beam pattern that causes the SINR to be the largest, which is predicted to occur during a time between the beam pattern p_(j, max) (s) being notified from the relay station 3 until the relay station 3 is notified of information about the beam pattern set P_(j, R) (s) from the control apparatus 1, and the information is used in the beam pattern update process by the relay station 3. Though the notification of the beam pattern from the relay station 3 to the control apparatus 1 is performed using the uplink, the notification of the information about the beam pattern set P_(j, R) (s) from the control apparatus 1 to the relay station 3 is performed using the downlink. Therefore, a slot in which the relay station 3 is notified of the information about the beam pattern P_(j, R) (s) from the control apparatus 1 is the first downlink slot after the s-th slot in which the beam pattern is notified from the relay station 3. This downlink slot is assumed as the (s+Δs3)-th slot. A change amount of the beam-direction angle at the beam pattern predicted to occur between the s-th slot and the (s+Δs3)-th slot can be said to be an offset at the time of using the beam pattern p_(j, max) (s) as a beam pattern predicted to cause the SINR to be the largest, in the (s+Δs3)-th slot. When a change amount of the beam-direction angle at the beam pattern predicted to occur between the s-th slot and the (s+Δs3)-th slot is indicated by Δθoffset(s+Δs3), Δθoffset(s+Δs3) is indicated by Formula 5 below using the change amount per unit time in the beam direction at the beam pattern that causes the SINR to be the largest. Here, Tslot indicates the time length of one slot.

$$\Delta\theta_{offset}(s + \Delta s3) = \frac{\Delta s3 \times T_{slot}}{\Delta T_{j,m}} \Delta\phi_{j,m}(s) \quad \text{(Formula 5)}$$

Then, the beam pattern that causes the SINR to be the largest in the (s+Δs3)-th slot is predicted as a beam pattern obtained by moving the beam direction at the beam pattern p_(j, max) (s) that causes the SINR to be the largest in the s-th slot by Δθoffset(s+Δs3). Therefore, in the second embodiment, the beam pattern predicted to cause the SINR to be the largest in the (s+Δs3)-th slot is set as the beam pattern p_(j, R) (s) to be the center. The beam pattern p_(j, R) (s) to be the center in the second embodiment is indicated by Formula 6 below.

$$p_{j,R}(s) = p_{j,max}(s) + \Delta\theta_{offset}(s + \Delta s3) \quad \text{(Formula 6)}$$

Figure 16:
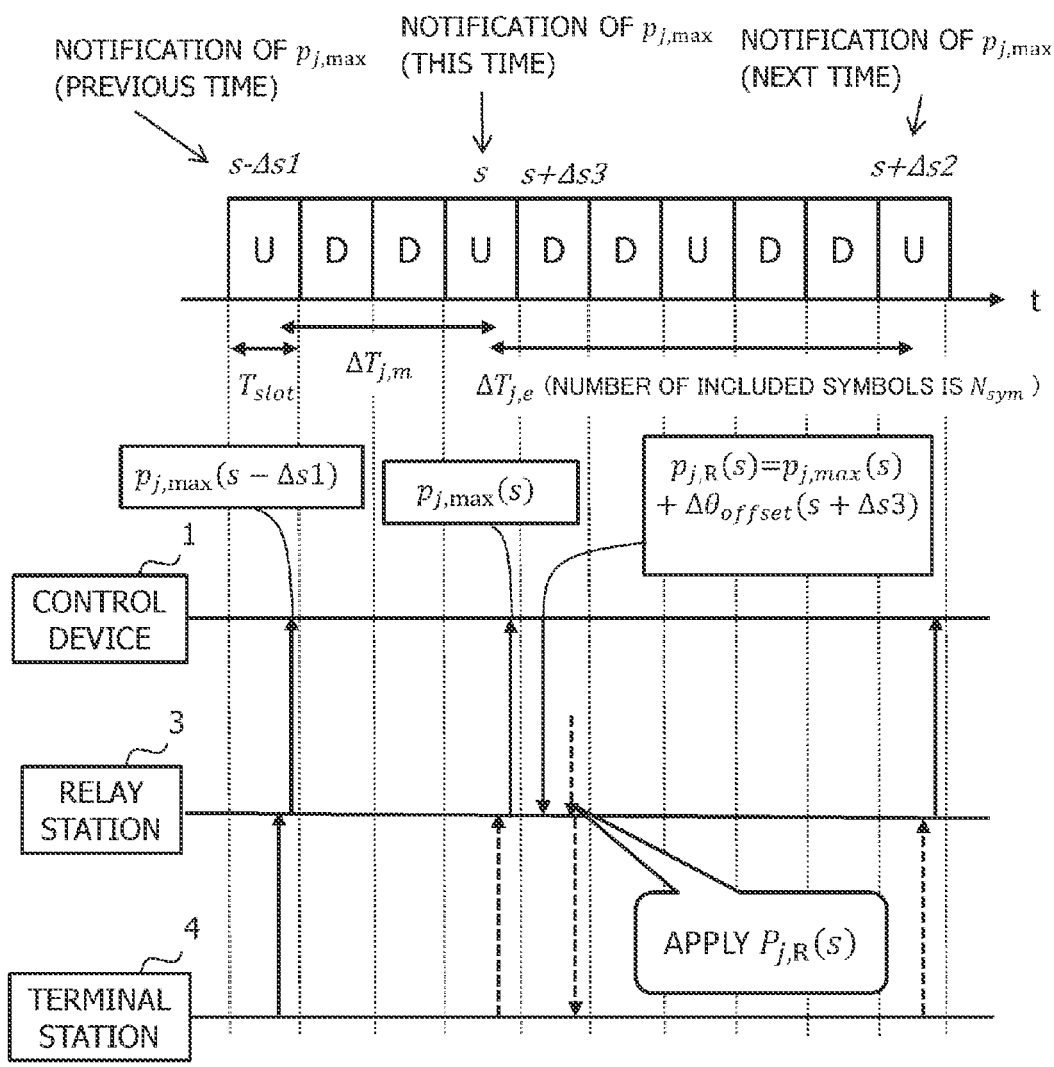
FIG. 16 is a diagram illustrating an example of a time chart in the beam pattern set update process in the second embodiment.

FIG. 16 is a diagram illustrating an example of a time chart in the beam pattern set update process in the second embodiment. FIG. 16 illustrates an example of assignment of slots to the uplink and the downlink. In FIG. 16, uplink slots are illustrated as "U" slots, and downlink slots are illustrated as "D" slots.

The (s−Δs1)-th, s-th, (s+Δs3)-th, and (s+Δs2)-th slots in the time chart illustrated in FIG. 16 correspond to the slots described with reference to FIG. 15, respectively. The time length of one slot is indicated by Tslot. The time length ΔT_(j, m) from the (s−Δs1)-th slot to the s-th slot is determined by the number of slots Δs1×Tslot. The time length ΔT_(j, e) from the s-th slot to the (s+Δs3)-th slot is determined by the number of slots Δs2×Tslot.

The s-th slot is an up slot. In the s-th slot, the relay station 3 acquires a beam pattern p_(j, max) (s) that causes the SINR to be the largest among beam patterns included in a beam pattern set P_(j, R) (s−Δs1), based on a received signal from the terminal station 4 and notifies the control apparatus 1 of the beam pattern p_(j, max) (s) (OP312 in FIG. 14). The control apparatus 1 acquires a beam pattern set P_(j, R) (s) from the beam pattern p_(j, max) (s−Δs1) notified from the relay station 3 in the (s−Δs1)-th uplink slot before the s-th slot and the beam pattern p_(j, max) (s), as illustrated with reference to FIG. 15.

The downlink slot after the s-th slot is the (s+Δs3)-th slot. In the (s+Δs3)-th downlink slot, the control apparatus 1 notifies the relay station 3 of information about the beam pattern set P_(j, R) (s). The relay station 3 receives the beam pattern set P_(j, R) (s) from the control apparatus 1 (OP313 of FIG. 14), updates the beam pattern set (OP314 of FIG. 14), and executes the beam pattern update process.

Though, each time an uplink slot ends, the relay station 3 executes notification of a beam pattern that causes the SINR to be the largest in the slot in FIG. 14, the timing of the notification of the beam pattern from the relay station 3 is not limited thereto. As illustrated in FIG. 16, the timing of the notification of the beam pattern from the relay station 3 does not have to be the timing of each end of each uplink slot. The method for setting the beam pattern p_(j, R) (s), the beam-direction angle range θ_(j, R), and the step width Δθ_(j, R) illustrated in FIGS. 15 and 16 is an example, and the method is not limited to the example illustrated in FIGS. 15 and 16. For example, the beam pattern p_(j, R) (s) may be set to the beam pattern p_(j, max) (s) itself notified from the relay station 3 in the s-th slot, without Δθoffset being added to the beam-direction angle.

Figure 17:
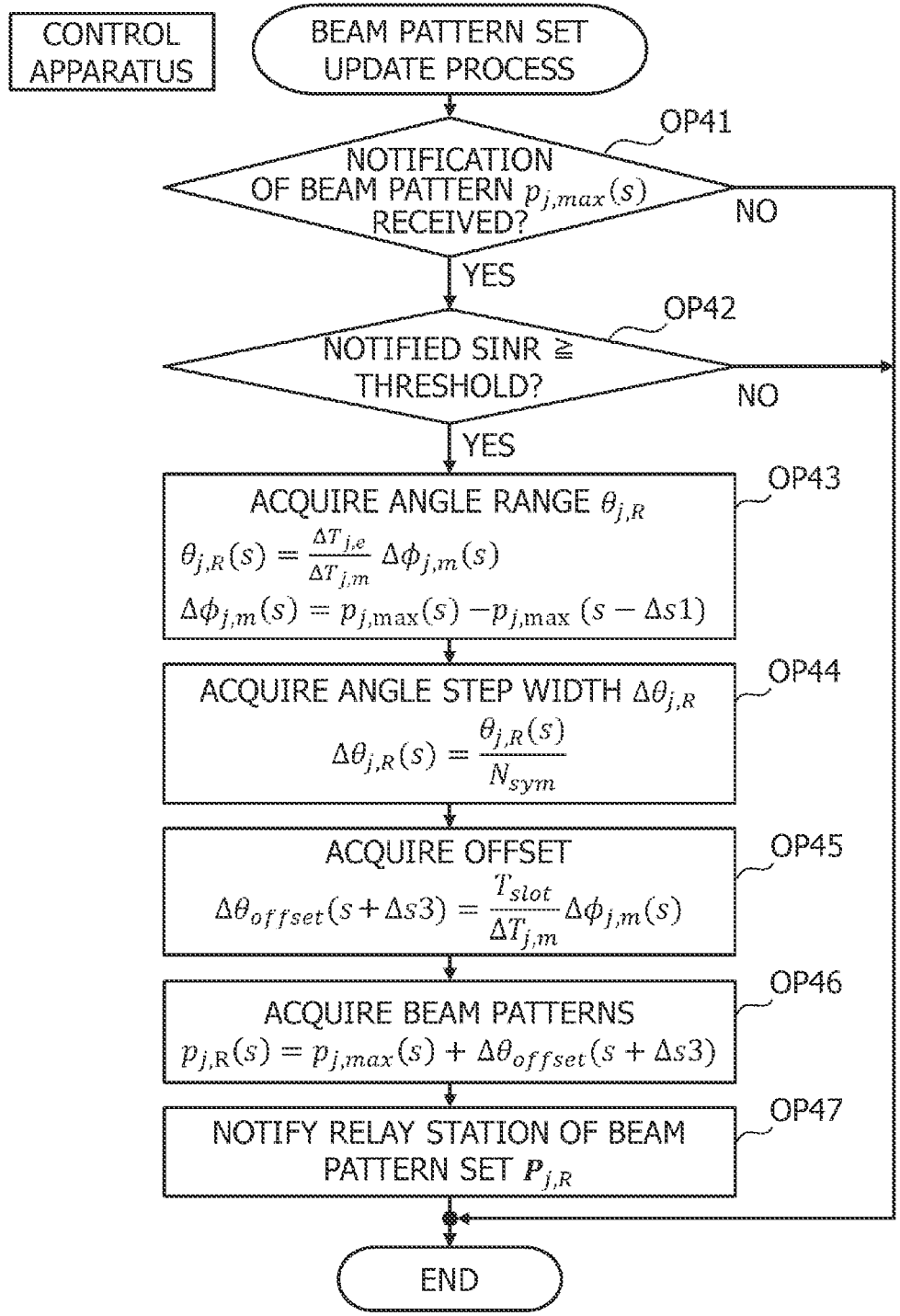
FIG. 17 illustrates an example of a flowchart of the beam pattern set update process of the control apparatus in the second embodiment.

FIG. 17 illustrates an example of a flowchart of the beam pattern set update process of the control apparatus 1 in the second embodiment. The process illustrated in FIG. 17 is repeatedly executed in a predetermined cycle. Though the entity to execute the process illustrated in FIG. 17 is the CPU 11 of the control apparatus 1, description will be made with the control apparatus 1 as the entity for convenience.

At OP41, the control apparatus 1 determines whether a notification of a beam pattern p_(j, max) (s) that causes the SINR to be the largest in the s-th uplink slot in a wireless frame, and the SINR at the beam pattern p_(j, max) (s) has been received from the relay station 3 or not. If the notification of the beam pattern p_(j, max) (s) and the SINR at the beam pattern p_(j, max) (s) has been received from the relay station 3 (OP41: YES), the process proceeds to OP42. If the notification of the beam pattern p_(j, max) (s) and the SINR at the beam pattern p_(j, max) (s) has not been received from the relay station 3 (OP41: NO), the process illustrated in FIG. 17 ends.

At OP42, the control apparatus 1 determines whether or not the SINR notified from the relay station 3 is equal to or above a threshold. If the SINR notified from the relay station 3 is equal to or above the threshold (OP42: YES), the process proceeds to OP43. If the SINR notified from the relay station 3 is below the threshold (OP42: NO), the process illustrated in FIG. 17 ends.

At OP43, the control apparatus 1 acquires a beam-direction angle range θ_(j, R) according to Formula 3. At OP44, the control apparatus 1 acquires a step width Δθ_(j, R) according to Formula 4. At OP45, the control apparatus 1 acquires an offset Δθoffset according to Formula 5. At OP46, the control apparatus 1 acquires a beam pattern p_(j, R) (s) according to Formula 6.

At OP47, the control apparatus 1 notifies the relay station 3 of information about a beam pattern set P_(j, R). The information about the beam pattern set P_(j, R) includes, the beam pattern p_(j, R) (s), the beam-direction angle range θ_(j, R), and the step width Δθ_(j, R). After that, the process illustrated in FIG. 17 ends.

In the second embodiment, the control apparatus 1 updates the beam pattern set P_(j, R) to be assigned to the relay station 3 based on change in the beam pattern that causes the SINR to be the largest, which is notified from the relay station 3. Thereby, the plurality of beam patterns included in the beam pattern set P_(j, R) to be assigned to the relay station 3 are also updated in response to movement of the terminal station 4. Since the beam pattern in use p_(j, curt) is updated with a beam pattern selected from the beam pattern set P_(j, R), it is possible to, by using the updated beam pattern in use p_(j, curt), provide more stable communication with a larger SINR value in response to position change due to movement of the terminal station 4.

Further, in the second embodiment, the beam pattern (j, R) (s) included in the beam pattern set P_(j, R) is acquired using the offset Δθoffset in consideration of a time difference due to notification from the control apparatus 1 to the relay station 3. Since the relay station 3 performs non-regenerative relay using the beam pattern p_(j, R) (s) after receiving the beam pattern set P_(j, R), the possibility that the SINR in the non-regenerative relay becomes the largest is strong, and communication with a higher quality can be provided.

Other Embodiments

The embodiments described above are examples, and the present disclosure may be changed and carried out as appropriate without departing from the gist of the present disclosure.

In the first and second embodiments, the control apparatus 1 determines a beam pattern set to be assigned to the relay station 3. Instead, the base station 2 may determine the beam pattern set to be assigned to the relay station 3. In this case, the base station 2 executes the processes that the control apparatus 1 executes in the first and second embodiments instead of the control apparatus 1. Alternatively, the relay station 3 itself may determine the beam pattern set alone and perform beam pattern update. In this case, the relay station 3 itself also executes processes other than the process related to communication with the control apparatus 1, for example, illustrated in FIG. 8 or 17. When the relay station 3 itself determines the beam pattern set, communication delay between the relay station 3 and the control apparatus 1 does not occur, and, therefore, the relay station 3 can acquire the beam pattern set earlier.

In the first and second embodiments, only the azimuth direction is dealt with as for the beam-direction angle of the beam pattern for the antennas of the relay station 3 for communication with the terminal station 4. Two directions of the azimuth direction and the elevation direction, however, may be dealt with as for the beam-direction angle. In this case, as a parameter indicating the beam-direction angle, an angle ϕ in the elevation direction is also used in addition to the angle θ in the azimuth direction. Even if the angle ϕ in the elevation direction is added to the beam-direction angle, the logic described in the first and second embodiments is not changed.

In the first and second embodiments, a relay station provided with a plurality of antenna elements that electrically perform beam forming by using variable weights is assumed as each relay station 3. The relay station 3, however, is not limited thereto. For example, a relay station provided with antennas that are mechanically changeable in orientations may be adopted as the relay station 3 if it is possible to physically change the orientations for every one or more symbols.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A relay station comprising:
a plurality of first antennas used for communication with a terminal station which is movable, wherein a beam direction of the plurality of first antennas are controlled according to a predetermined beam pattern and the beam direction is a direction in which antenna gain is increased;
one or more second antennas used for communication with a base station;
a radio device configured to perform non-regenerative relay of relaying a signal without demodulating or decoding the signal between the base station and the terminal station; and
a controller configured to:
acquire information about a beam pattern set acquired based on a first beam pattern that causes an SINR (signal to interference and noise power ratio) of a received signal from the terminal station to be largest, the received signal having been measured in a first slot of a wireless frame and including at least a part of self-interference that occurs between signals transmitted and received by the plurality of first antennas and signals transmitted and received by the one or more second antennas by the non-regenerative relay;
select, in a second slot after the first slot, a second beam pattern from among a plurality of beam patterns included in the beam pattern set, based on SINRs of received signals from the terminal station, wherein each of the received signals includes at least the part of the self-interference, and wherein the received signals are measured in one or more consecutive symbols for each of the plurality of beam patterns; and
update a beam pattern to be used for the plurality of first antennas to the second beam pattern, in a symbol following the one or more consecutive symbols.

2. The relay station according to claim 1, wherein the information about the beam pattern set includes information about a third beam pattern acquired based on the first beam pattern and information about the plurality of beam patterns, wherein beam directions at the plurality of beam patterns are beam directions within a first beam-direction range defined by a first angle from a beam direction at the third beam pattern.

3. The relay station according to claim 2, wherein
the plurality of beam patterns are arranged such that beam directions at the plurality of beam patterns are at equal angular intervals of a second angle; and
the information about the plurality of beam patterns includes at least the first angle and the second angle.

4. The relay station according to claim 3, wherein
the first range has a width of the first angle in each of a positive direction and a negative direction from the beam direction at the third beam pattern;
the third beam pattern is set to the first beam pattern;
the first angle is set to a first predetermined value set in advance; and
the second angle is set to a second predetermined value set in advance.

5. The relay station according to claim 3, wherein
the controller is configured to acquire the first beam pattern that causes the SINR of the received signal from the terminal station to be largest at a predetermined timing, the received signal including at least the part of the self-interference;
the third beam pattern is set to the first beam pattern acquired in the first slot;
the first angle is set to a first change amount of a beam-direction angle from the first beam pattern in the first slot to a beam pattern that causes the SINR to be largest in a fourth slot, the first change amount being estimated from a first beam direction change caused by change from the first beam pattern in a third slot to the first beam pattern in the first slot, the third slot being a slot in which the first beam pattern is acquired immediately before the first slot, and the forth slot being a slot in which the first beam pattern is scheduled to be acquired immediately after the first slot; and
the second angle is set to a second change amount of a beam-direction angle per symbol in a period between acquisition timings of the first beam pattern in the first slot and the beam pattern that causes the SINR to be largest in the fourth slot, the second change amount being estimated from the first change.

6. The relay station according to claim 5, wherein
the controller is configured to receive the information about the beam pattern set from a first apparatus on an upstream side; and
the third beam pattern is set to a beam pattern obtained by changing a beam direction at the first beam pattern acquired in the first slot by an amount corresponding to a third change amount of a beam-direction angle caused by change from the first beam pattern in the first slot to a beam pattern estimated to cause the SINR to be largest in the second slot, the third change amount corresponding to a time difference between the first slot and the second slot in which use of the information about the beam pattern set is started at the relay station, the third change amount being estimated from the first change.

7. The relay station according to claim 1, wherein the controller is configured to receive the information about the beam pattern set from the first apparatus on an upstream side.

8. The relay station according to claim 1, wherein, in the second slot, the controller is configured to select such a beam pattern at which a beam direction closest to a moving average value as the second beam pattern, the moving average value being a moving average value of beam directions at beam patterns that causes the SINR to be largest in symbols included in a moving average window having a window size of a first number of symbols, including a current symbol.

9. The relay station according to claim 1, wherein, when, in the second slot, a beam direction at a beam pattern that has caused the SINR to be largest has changed in a positive or negative direction relative to a beam direction at a beam pattern currently in use by the plurality of first antennas, in a consecutive second number of symbols, the controller is configured to select a beam pattern with a beam direction changed by a predetermined angle from a beam direction at the beam pattern currently in use in the positive or negative direction, as the second beam pattern.

10. The relay station according to claim 8, wherein the controller is configured to set the first number of symbols as a largest number of symbols equal to or shorter than coherent time in used frequency relative to a first movement speed of the terminal station.

11. The relay station according to claim 10, wherein the controller is configured to calculate the first movement speed of the terminal station from a cyclic prefix of a received signal in an uplink slot immediately before the second slot.

12. The relay station according to claim 10, wherein the controller is acquire the first movement speed of the terminal station from a core network.

13. The relay station according to claim 8, wherein the controller is configured to:
determine, based on, for each of a plurality of symbols included in an uplink slot immediately before the second slot, a symbol number in the uplink slot immediately before the second slot and a beam direction at a beam pattern that causes the SINR to be largest, one or more coefficients of an explanatory variable in a predetermined regression model formula with a symbol number of one symbol in one slot as the explanatory variable and with a beam direction at a beam pattern that gives a largest SINR in the one symbol as an objective function; and
determine the first number of symbols based on a deviation of a value of the objective variable in a case of inputting, for each of the plurality of symbols included in the second slot, a symbol number of a symbol to the explanatory variable of the predetermined regression model formula to which the one or more coefficients are applied, from a beam direction at a beam pattern that gives a largest SINR in the symbol, and a target deviation.

14. An information processing apparatus comprising a controller configured to:
receive a first beam pattern from a relay station, wherein the relay station includes a plurality of first antennas used for communication with a terminal station which is movable, one or more second antennas used for communication with a base station, and a radio device configured to perform non-regenerative relay of relaying a signal without demodulating or decoding the signal between the base station and the terminal station, wherein a beam direction of the plurality of first antennas are controlled according to a predetermined beam pattern and the beam direction is a direction in which antenna gain is increased, wherein the first beam pattern causes an SINR (signal to interference and noise power ratio) of a received signal from the terminal station to be largest, and wherein the received signal has been measured in a first slot of a wireless frame and including at least a part of self-interference that occurs between signals transmitted and received by the plurality of first antennas and signals transmitted and received by the one or more second antennas by the non-regenerative relay;
acquire information about a beam pattern set based on the first beam pattern; and
transmit the information about the beam pattern set to the relay station; wherein
the relay station:
selects, in a second slot after the first slot, a second beam pattern from among a plurality of beam patterns included in the beam pattern set, based on SINRs of received signals from the terminal station, wherein each of the received signals includes at least the part of the self-interference, and wherein the received signals are measured in one or more consecutive symbols for each of the plurality of beam patterns; and update a beam pattern to be used for the plurality of first antennas to the second beam pattern, in a symbol following the one or more consecutive symbols.

15. The information processing apparatus according to claim 14, wherein the controller is configured to acquire the information about the beam pattern set, including information about a third beam pattern acquired based on the first beam pattern and information about the plurality of beam patterns, wherein beam directions at the plurality of beam patterns are beam directions within a first beam-direction range defined by a first angle from a beam direction at the third beam pattern.

16. The information processing apparatus according to claim 15, wherein the controller is configured to:
set the plurality of beam patterns to a plurality of beam patterns that are arranged such that beam directions at the plurality of beam patterns are at equal angular intervals of a second angle; and
include at least the first angle and the second angle into the information about the plurality of beam patterns.

17. The information processing apparatus according to claim 16, wherein the controller is configured to:
set the first range to a range having a width of the first angle in each of a positive direction and a negative direction from the beam direction at the third beam pattern;
set the third beam pattern to the first beam pattern;
set the first angle to a first predetermined value set in advance; and
set the second angle to a second predetermined value set in advance.

18. The information processing apparatus according to claim 16, wherein
the relay station acquires the first beam pattern that causes the SINR of the received signal from the terminal station to be largest at a predetermined timing, the received signal including at least the part of the self-interference;
the controller
sets the third beam pattern to the first beam pattern acquired in the first slot;
sets the first angle to a first change amount of a beam-direction angle from the first beam pattern in the first slot to a beam pattern that causes the SINR to be largest in a fourth slot, the first change amount being estimated from a first beam direction change caused by change from the first beam pattern in a third slot to the first beam pattern in the first slot, the third slot being a slot in which the first beam pattern is acquired immediately before the first slot, and the forth slot being a slot in which the first beam pattern is scheduled to be acquired immediately after the first slot; and
sets the second angle to a second change amount of a beam-direction angle per symbol in a period between acquisition timings of the first beam pattern in the first slot and the beam pattern that causes the SINR to be largest in the fourth slot, the second change amount being estimated from the first change.

19. The information processing apparatus according to claim 18, wherein the controller sets the third beam pattern to a beam pattern obtained by changing a beam direction at the first beam pattern acquired in the first slot by an amount corresponding to a third change amount of a beam-direction angle caused by change from the first beam pattern in the first slot to a beam pattern estimated to cause the SINR to be largest in the second slot, the third change amount corresponding to a time difference between the first slot and the second slot in which the information about the beam pattern set is applied at the relay station, the third change amount being estimated from the first change.

20. A method comprising:
transmitting, by a relay station, a first beam pattern that causes an SINR (signal to interference and noise power ratio) of a received signal from a terminal station which is movable to be largest, the received signal having been measured in a first slot of a wireless frame and including at least a part of self-interference that occurs between signals transmitted and received by a plurality of first antennas and signals transmitted and received by one or more second antennas by non-regenerative relay,
the relay station comprising:
the plurality of first antennas used for communication with the terminal station, wherein a beam direction of the plurality of first antennas are controlled according to a predetermined beam pattern and the beam direction is a direction in which antenna gain is increased;
the one or more second antennas used for communication with a base station; and
a radio device configured to perform the non-regenerative relay of relaying a signal without demodulating or decoding the signal between the base station and the terminal station;
receiving, by an information processing apparatus, the first beam pattern from the relay station;
acquiring, the information processing apparatus, information about a beam pattern set based on the first beam pattern;
transmitting, by the information processing apparatus, the information about the beam pattern set to the relay station;
selecting, the relay station, in a second slot after the first slot, a second beam pattern from among a plurality of beam patterns included in the beam pattern set, based on SINRs of received signals from the terminal station, wherein each of the received signals includes at least the part of the self-interference, wherein the received signals are measured in one or more consecutive symbols for each of the plurality of beam patterns; and
updating, the relay station, a beam pattern to be used for the plurality of first antennas to the second beam pattern, in a symbol following the one or more consecutive symbols.

* * * * *